(12) United States Patent
Nadji-Tehrani

(10) Patent No.: US 11,640,520 B2
(45) Date of Patent: May 2, 2023

(54) SYSTEM AND METHOD FOR COGNITIVE SELF-IMPROVEMENT OF SMART SYSTEMS AND DEVICES WITHOUT PROGRAMMING

(71) Applicant: NEURAVILLE, LLC, Pittsburgh, PA (US)

(72) Inventor: Mohammad Nadji-Tehrani, Pittsburgh, PA (US)

(73) Assignee: NEURAVILLE, LLC, Pittsburgh, PA (US)

( * ) Notice: Subject to any disclaimer, the term of this patent is extended or adjusted under 35 U.S.C. 154(b) by 127 days.

(21) Appl. No.: 17/405,967

(22) Filed: Aug. 18, 2021

(65) Prior Publication Data
US 2022/0269923 A1    Aug. 25, 2022

Related U.S. Application Data

(63) Continuation of application No. 17/182,722, filed on Feb. 23, 2021, now Pat. No. 11,132,598.

(51) Int. Cl.
*G06F 17/00* (2019.01)
*G06N 3/045* (2023.01)
(Continued)

(52) U.S. Cl.
CPC .............. *G06N 3/045* (2023.01); *B25J 9/163* (2013.01); *G06N 3/049* (2013.01); *G06N 3/08* (2013.01)

(58) Field of Classification Search
CPC .......... G06N 3/045; G06N 3/049; G06N 3/08; G06N 3/082; G06N 3/088; B25J 9/163
(Continued)

(56) References Cited

U.S. PATENT DOCUMENTS 7,937,337 B2    5/2011  Lee et al.
8,260,460 B2    9/2012  Sanders et al.
(Continued)

FOREIGN PATENT DOCUMENTS

EP    3 121 767 A1    1/2017

OTHER PUBLICATIONS

Gruau, Frédéric et al., "A Comparison between Cellular Encoding and Direct Encoding for Genetic Neural Networks," pp. 81-89.
(Continued)

*Primary Examiner* — Ronnie M Mancho
(74) *Attorney, Agent, or Firm* — Lewis Roca Rothgerber Christie LLP

(57) ABSTRACT

A method for automatically generating a neural network architecture includes: loading a first computer-readable representation of a first neural network architecture including first genes representing parameters of the first neural network architecture; generating a first neural network including neurons in accordance with the first genes; deploying the first neural network in a robotic controller; training the first neural network by supplying inputs to an input processing unit connected to the first neural network and receiving outputs from an output processing unit connected to the first neural network, the training including updating synaptic weights of connections between the neurons based on responses to the inputs supplied to the input processing unit; evaluating a performance of the first neural network architecture; and generating, by the computer system, an updated computer-readable representation of an updated neural network architecture based on the evaluation of the performance the first neural network.

21 Claims, 24 Drawing Sheets

(51) Int. Cl.
  *B25J 9/16* (2006.01)
  *G06N 3/08* (2023.01)
  *G06N 3/049* (2023.01)

(58) Field of Classification Search
  USPC .......................................................... 706/23
  See application file for complete search history.

(56) References Cited

U.S. PATENT DOCUMENTS

| | | | |
|---|---|---|---|
| 8,793,205 | B1 | 7/2014 | Fisher et al. |
| 9,129,221 | B2 | 9/2015 | Piekniewski et al. |
| 9,186,793 | B1 | 11/2015 | Meier |
| 2006/0224532 | A1 | 10/2006 | Duan et al. |
| 2009/0182697 | A1 | 7/2009 | Massaquoi |
| 2012/0303562 | A1 | 11/2012 | Paguio |
| 2015/0106310 | A1 | 4/2015 | Birdwell et al. |
| 2015/0306763 | A1 | 10/2015 | Meier et al. |
| 2017/0249387 | A1 | 8/2017 | Hatami-Hanza |
| 2018/0330824 | A1 | 11/2018 | Athey et al. |
| 2018/0357545 | A1 | 12/2018 | Busbice et al. |
| 2019/0095778 | A1 | 3/2019 | Buchanan |
| 2019/0114391 | A1 | 4/2019 | Jaganathan et al. |
| 2019/0114511 | A1 | 4/2019 | Gao et al. |
| 2019/0266493 | A1 | 8/2019 | Gao et al. |
| 2019/0354842 | A1 | 11/2019 | Louizos et al. |
| 2019/0385704 | A1 | 12/2019 | Oster |
| 2020/0134461 | A1 | 4/2020 | Chai et al. |
| 2020/0160535 | A1 | 5/2020 | Ali Akbarian et al. |
| 2020/0227168 | A1 | 7/2020 | Kimmerling et al. |
| 2020/0272864 | A1 | 8/2020 | Faust et al. |
| 2021/0019598 | A1 | 1/2021 | Rapsomaniki et al. |
| 2021/0020314 | A1 | 1/2021 | Ehrich et al. |
| 2021/0056412 | A1 | 2/2021 | Jung |

OTHER PUBLICATIONS

Tieck, J. Camilo Vasquez et al., "The Neurorobotics Platform for Teaching—Embodiment Experiments with Spiking Neural Networks and Virtual Robots," 2019 IEEE International Conference on Cyborg and Bionic Systems (CBS), 8 pages.
Gruau, Frédéric, "Genetic Synthesis of Modular Neural Networks." pp. 318-325.
Whitley, Darrell et al., "Cellular Encoding Applied to Neurocontrol," Department of Computer Science, Colorado State University, 8 pages.
Tao, Shi et al., "Research on Intrinsic Motivation of Robot Based on Central Nervous System," 2014 26th Chinese Control and Decision Conference (CCDC), IEEE, pp. 2719-2723.
Tao, Shi et al., "A Study on Autonomous Learning Mechanism of Cognitive Robot," 2015 27th Chinese Control and Decision Conference (CCDC), IEEE, pp. 3243-3247.
Eliasmith, Chris et al., "The use and abuse of large-scale brain models," www.sciencedirect.com. Current Opinion in Neurobiology, 2014, 25:1-6.
Eliasmith, Chris et al., "A Large-Scale Model of the Functioning Brain," downloaded from www.sciencemag.org on Nov. 29, 2012, Nov. 30, 2012 vol. 338, pp. 1202-1205.
Bekolay, Trevor et al., "Nengo: a Python tool for building large-scale functional brain models," Frontiers in Neuroinformatics, www.frontiersin.org, Jan. 2014, vol. 7, Article 48, pp. 1-13.
Maass, W., "Networks of Spiking Neurons: The Third Generation of Neural Network Models," *Neural Networks*, vol. 10, No. 9, 1997 pp. 1659-1671.
Ananthanarayanan, Rajagopal et al., "The Cat is Out of the Bag: Cortical Simulations with $10^9$ Neurons, $10^{13}$ Synapses," Nov. 2009, in *Proceedings of the conference on high performance computing networking, storage and analysis*, pp. 1-12.
Koehn, Philipp "Combining Genetic Algorithms and Neural Networks: The Encoding Problem." (1994), 67 pages.

Stanley, Kenneth O., et al., "A Taxonomy for Artificial Embryogeny," Artificial Life 9: 93-130, 2003, 47 pages.
Stanley, Kenneth O. "Compositional pattern producing networks: A novel abstraction of development," Genet Program Evolvable, Mar. 2007 8:131-162.
Clune, Jeff et al., "Evolving Coordinated Quadruped Gaits with the HyperNEAT Generative Encoding," In Proceedings of the 2009 IEEE Congress on Evolutionary Computation (CEC), Trondheim, Norway, May 2009, 8 pages.
Huizinga, Joost et al., "Evolving Neural Networks That Are Both Modular and Regular: HyperNeat Plus the Connection Cost Technique," GECCO '14: Proceedings of the 2014 Annual Conference on Genetic and Evolutionary Computation, ACM, 2014, Vancouver, Canada, pp. 697-704. Hal-01300699.
Schrum, Jacob et al., "Automatic Evolution of Multimodal Behavior with Multi-Brain HyperNEAT," GECCO' 16 Companion, Jul. 20-24, 2016, Denver, CO, 2 pages.
Schrum, Jacob et al., "Using Indirect Encoding of Multiple Brains to Produce Multimodal Behavior," arXiv:1604.07806v1 [cs.AI] Apr. 26, 2016, 12 pages.
Rast, A.D., et al., "The Leaky Integrate-and-Fire Neuron: A Platform for Synaptic Model Exploration on the SpiNNaker Chip," *The 2010 International Joint Conference on Neural Networks (IJCNN)*. IEEE, 2010, 8 pages.
Mattia, Maurizio et al., "Efficient Event-Driven Simulation of Large Networks of Spiking Neurons and Dynamical Synapses," Neural Computation 12, 2305-2329, 2000.
Delorme, Arnaud et al., "SpikeNET: an event-driven simulation package for modelling large networks of spiking neurons," Network: Computation in Neural Systems 14 (2003), pp. 613-627.
Rochel, Olivier et al., "An event-driven framework for the simulation of networks of spiking neurons," 11th European Symposium On Artificial Neural Networks—ESANN'2003, Apr. 2003, Bruges, Belgium, inria-00099501, 7 pages.
Ros, Eduardo et al., "Event-Driven Simulation Scheme for Spiking Neural Networks Using Lookup Tables to Characterize Neuronal Dynamics," Neural Computation 18, 2006, pp. 2959-2993.
Ciresan, Dan et al., "Multi-column Deep Neural Networks for Image Classification," Technical Report No. IDSIA-04-12, Feb. 2012, 20 pages.
Garcí, D. H., et al., "Visual attention and object naming in humanoid robots using a bio-inspired spiking neural network," *Robotics and Autonomous Systems*, 104 (2018) pp. 56-71.
Nadji-Tehrani, Mohammad, et al., "A Brain-Inspired Framework for Evolutionary Artificial General Intelligence," *IEEE transactions on neural networks and learning systems* 31.12 (2020): 5257-5271.
Alnajjar, Fady et al., "Sensor-Fusion in Spiking Neural Network that Generates Autonomous Behavior in Real Mobile Robot," 2008 International Joint Conference on Neural Networks, pp. 2200-2206.
Ascoli, Giorgio A. et al., "Generation, description and storage of dendritic morphology data," The Royal Society, 2001, pp. 1131-1145.
Chou, Ting-Shuo et al., "CARLsim 4: An Open Source Library for Large Scale, Biologically Detailed Spiking Neural Network Simulation using Heterogeneous Clusters," IEEE, 2018, pp. 1158-1165.
Floreano, Dario et al., "From Wheels to Wings with Evolutionary Spiking Circuits," Artifical life 11.1-2 (2005), 22 pages.
Marjaninejad, Ali et al., "Autonomous functional movements in a tendon-driven limb via limited experience," Nature Machine Intelligence, vol. 1, Mar. 2019, pp. 144-154.
Reiter, Philippe et al., "Neuromorphic Processing & Sensing: Evolutionary Progression of AI to Spiking," Article submitted to the University of Strathclyde on Apr. 24, 2020, 15 pages.
Rounds, Emily L. et al., "An Evolutionary Framework for Replicating Neurophysiological Data with Spiking Neural Networks," Springer International Publishing AG 2016, pp. 537-547.
Schaffer, J. David, "Evolving Spiking Neural Networks: A Novel Growth Algorithm Corrects the Teacher," Computational Intelligence in Security & Defense Applications 2015, IEEE, 8 pages.
Yee, Elias E. et al., "Evolutionary Spiking Neural Networks as Racing Car Controllers," International Journal of Computer Information Systems and Industrial Management Applications 2150-7988 vol. 5 (2013), pp. 365-372.

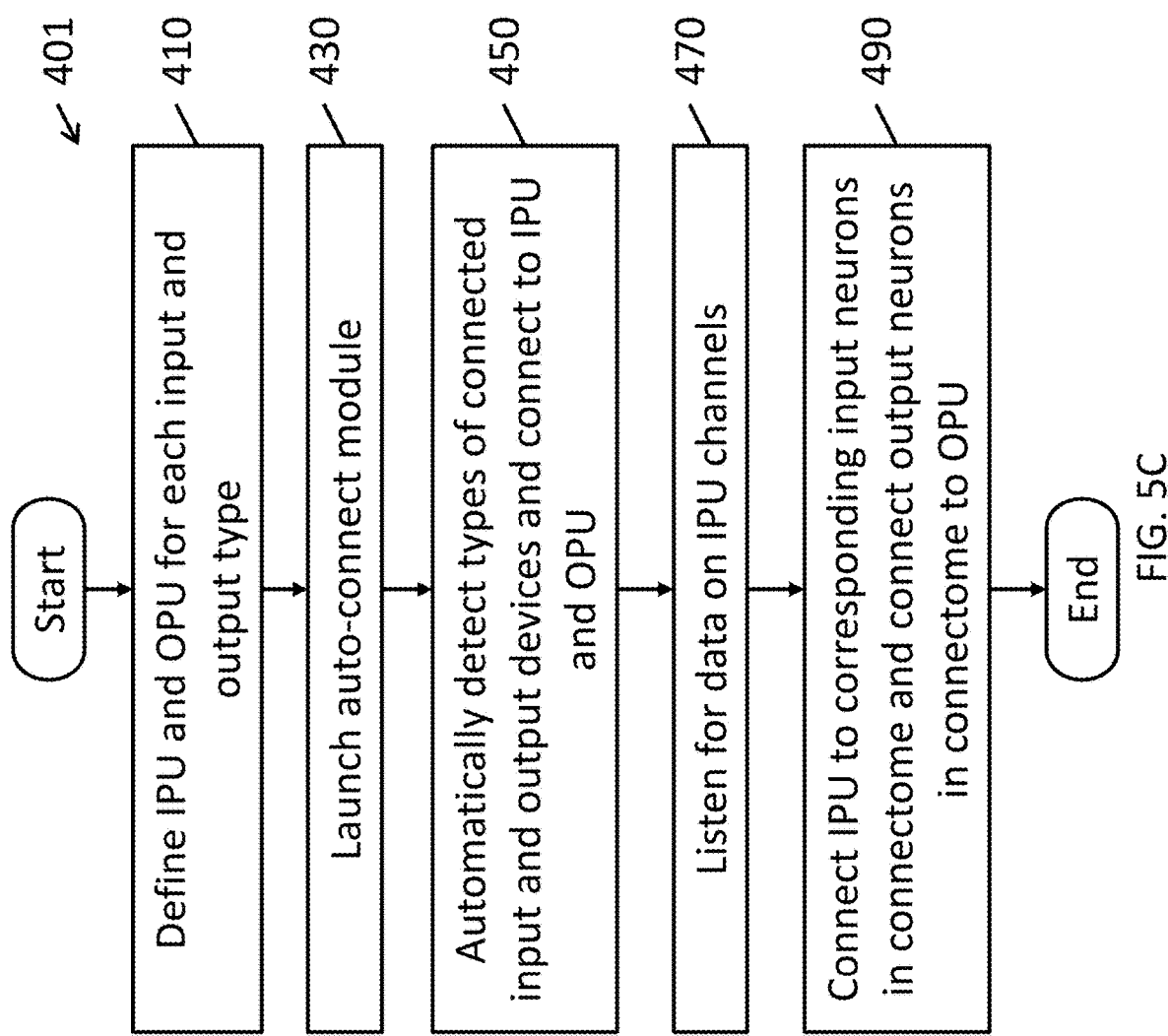

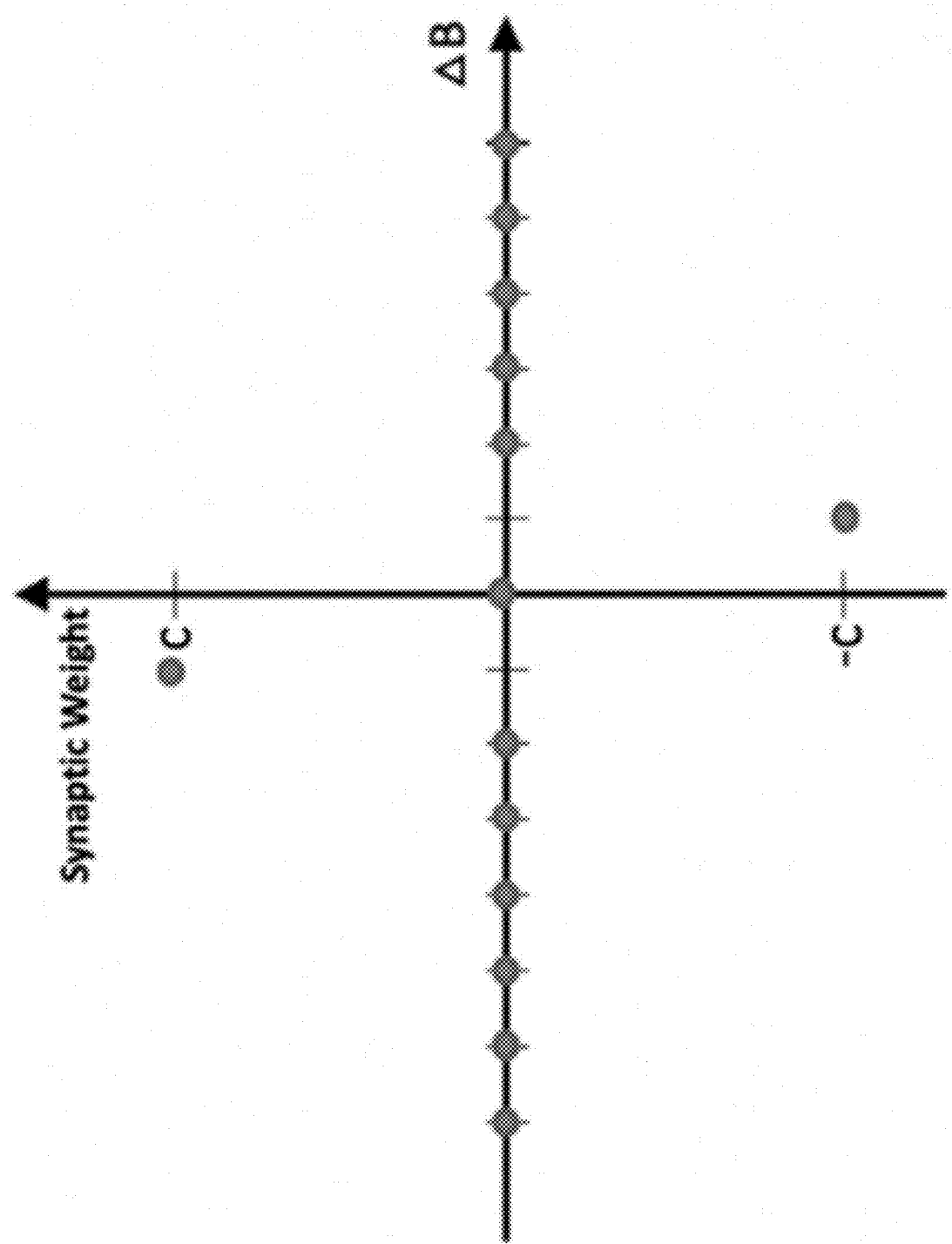

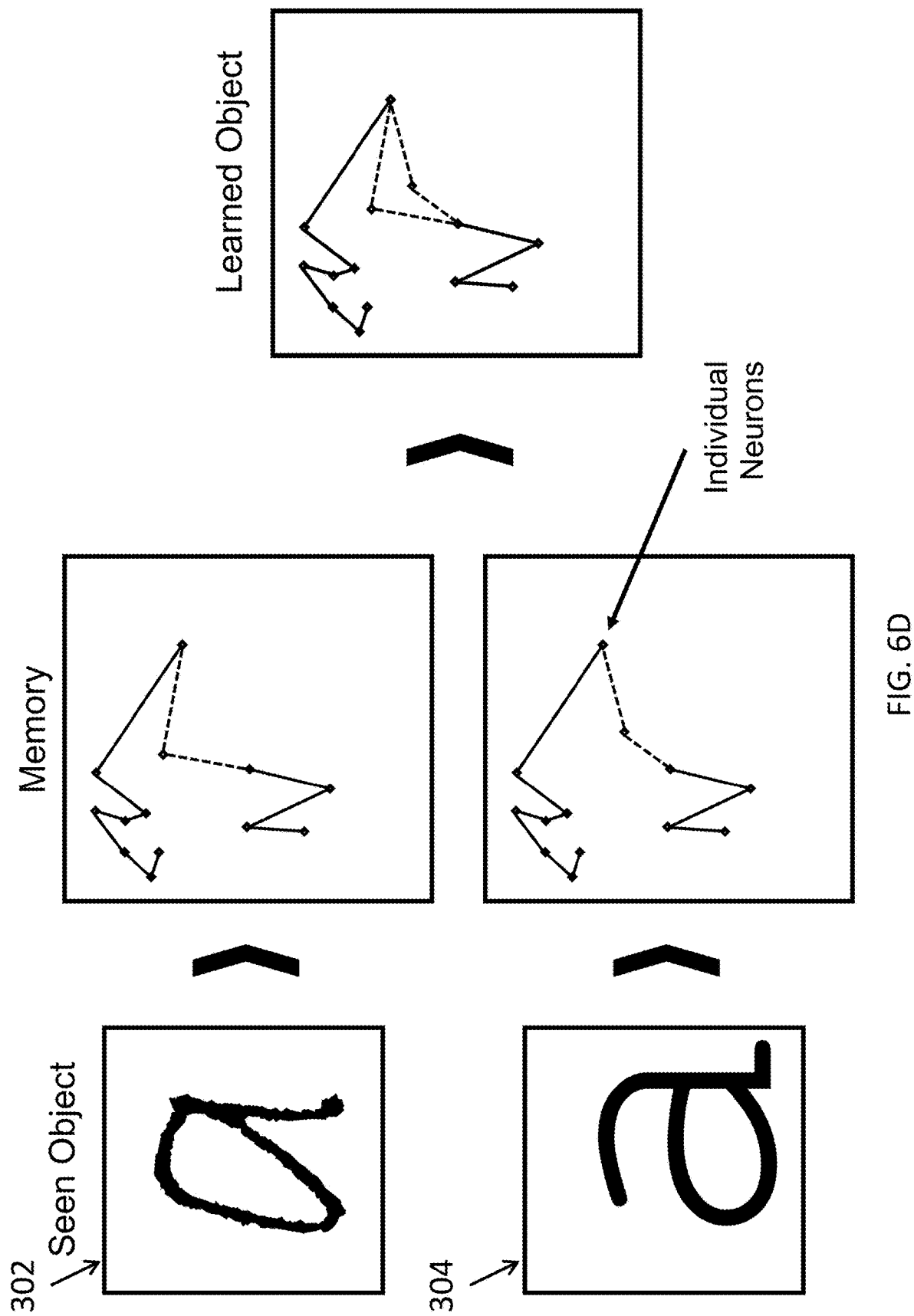

SYSTEM AND METHOD FOR COGNITIVE SELF-IMPROVEMENT OF SMART SYSTEMS AND DEVICES WITHOUT PROGRAMMING

CROSS-REFERENCE TO RELATED APPLICATION(S)

The present application is a continuation of U.S. patent application Ser. No. 17/182,722, filed on Feb. 23, 2021 and entitled "SYSTEM AND METHOD FOR HUMANOID ROBOT CONTROL AND COGNITIVE SELF-IMPROVEMENT WITHOUT PROGRAMMING" the entire content of which is hereby expressly incorporated by reference.

FIELD

Aspects of embodiments of the present disclosure relate to computer systems based on biological models, including artificial neural networks such as spiking neural networks and computer systems simulating physical entities controlled by simulated intelligence.

BACKGROUND

Researchers have been pursuing human brain simulation with different objectives for many years. Some have quested to understand better how the human brain functions and to assist in root-causing brain-related disorders, and others have sought to create artificial intelligence (AI) systems modeled after human brains.

Many artificial intelligence systems have architectures that are fixed in accordance predefined models. For example, artificial deep neural networks generally have a fixed architecture designed by an engineer or researcher, where the architecture of the model may be inspired in part by structures of human brains. The fixed model is then trained to compute a desired output by updating parameters relating to the strength of connections between different parts of the fixed architecture. Examples of architectures of fixed models used in the context of deep convolutional neural networks for machine vision include LeNet, AlexNet, VGGNet, ResNet, MobileNet (including MobileNet V2 and MobileNet V3), and FractalNet.

In the field of robotics, middleware software suites such as Robot Operating System (ROS) provide frameworks or application programming interfaces for connecting to robotics components, such as sensors and actuators, and providing control of those components, such as driving one or more motors of a robot.

SUMMARY

Aspects of embodiments of the present disclosure relate to systems and methods for automatically updating a neural network architecture based on training neural networks and generating interfaces between neural networks and input and output devices.

According to one embodiment of the present disclosure, a method for automatically generating an architecture of a neural network includes: loading, by a computer system including a processor and memory, a first computer-readable representation of a first neural network architecture, the first computer-readable representation including a first genome including a first plurality of genes representing parameters of the first neural network architecture; generating, by the computer system, a first neural network in accordance with the first neural network architecture specified in the first computer-readable representation, the first neural network including a plurality of neurons; deploying, by the computer system, the first neural network in a robotic controller; training the first neural network deployed in the robotic controller by supplying inputs to an input processing unit connected to the first neural network and receiving outputs from an output processing unit connected to the first neural network, the training including updating a plurality of synaptic weights of a plurality of connections between the neurons of the first neural network based on responses to the inputs supplied to the input processing unit; evaluating, by the computer system, a performance of the first neural network architecture based on the training of the first neural network; and generating, by the computer system, an updated computer-readable representation of an updated neural network architecture based on the evaluation of the performance the first neural network, the updated computer-readable representation including an updated genome including an updated plurality of genes representing parameters of the updated neural network architecture.

The method may further include generating, by the computer system, an updated neural network in accordance with the updated neural network architecture specified in the updated computer-readable representation.

The first computer-readable representation may be a key-value map or a graph-based data structure.

The generating the first neural network may include: generating a plurality of layers of the first neural network in accordance with a cortical blueprint of the first computer-readable representation; defining a plurality of neurons within each of the layers in accordance with definitions of the layers in the cortical blueprint; and connecting the neurons of the layers in accordance with a plurality of growth rules of the first computer-readable representation.

The cortical blueprint may specify a plurality three-dimensional (3-D) geometrical spaces corresponding to the plurality of layers, the cortical blueprint may specify populations of neurons within the 3-D geometrical spaces; and the growth rules may include: rules defining connections between neurons of the same 3-D geometrical spaces; and rules defining connections between different ones of the 3-D geometrical spaces based on geometrical and/or spatial orientation.

The growth rules may include geometric rules for connecting a source neuron to a destination neuron, the geometric rules may specify a 3-D geometric shape defined based on the source neuron, the 3-D geometric shape may define a 3-D region including a plurality of candidate neurons, and the destination neuron may be selected from the candidate neurons.

The architecture may include layers corresponding to a cortical pathway of a biological brain.

The input processing unit may include a plurality of input neurons, the computer system may be connected to an input device, and the memory of the computer system may store a middleware module configured to map input signals from the input device to activations of the input neurons of the input processing unit.

The input device may be a camera, the input signals may include an image including a plurality of pixels, the input neurons may be arranged in a two-dimensional grid, and the middleware module may be configured to map intensities of pixels of the image to neurons in corresponding portions of the two-dimensional grid.

The input device may be a microphone, the input signals may include an audio signal, the input neurons may be arranged in a linear array corresponding to different portions of an audio spectrum, and the middleware module may be configured to map the audio signal to the input neurons in accordance with coefficients representing a spectrum of a time window of the audio signal.

The computer system may be connected to a first input device and a second input device, the input processing unit may be connected to a plurality of first input neurons and a plurality of second input neurons, the memory of the computer system may store a middleware module configured to: map a plurality of first input signals from the first input device to activations of the first input neurons; and map a plurality of second input signals from the second input device to activations of the second input neurons, the activations of the first input neurons trigger a first input cortical pathway of the first neural network, the activations of the second input neurons trigger a second input cortical pathway of the first neural network, and the first input cortical pathway and the second input cortical pathway connect together at a sensor fusion cortical area of the first neural network.

A plurality of output neurons may be connected to the output processing unit, the computer system may be connected to an output device, and the memory of the computer system may store a middleware module configured to map activations of the output neurons, received at the output processing unit, to commands to control the output device.

The output device may be a motor, the output neurons may include: a first plurality of output neurons corresponding to a first command to control the motor; and a second plurality of output neurons corresponding to a second command to control the motor, and the middleware module may be configured to: output the first command to the motor in response to detecting activations of the first output neurons; and output the second command to the motor in response to detecting activations of the second output neurons.

The output device may be a controllable device in accordance with a configuration setting, the output neurons may include: a first plurality of output neurons corresponding to a first value of the configuration setting; and a second plurality of output neurons corresponding to a second value of the configuration setting, and the middleware module may be configured to: configure the configuration setting of the controllable device to have the first value in response to detecting activations of the first output neurons; and configure the configuration setting of the controllable device to have the second value in response to detecting activations of the second output neurons.

The evaluating the performance of the first neural network architecture may include: detecting a dominant value of the configuration setting; and flagging a region including the output neurons for mutation when generating the updated computer-readable representation of the updated neural network architecture.

The computer system may be connected to a first output device and a second output device, the first neural network may include a plurality of first output neurons and a plurality of second output neurons, the memory of the computer system may store a middleware module configured to: map a plurality of first activations of a sensor fusion cortical layer of the first neural network to a first output cortical pathway of the first neural network; and map a plurality of second activations of the sensor fusion cortical layer of the first neural network to a second output cortical pathway of the first neural network, the first output cortical pathway may be connected to the first output neurons and the first output neurons are configured to control the first output device, the second output cortical pathway may be connected to the second output neurons and the second output neurons are configured to control the second output device.

The training the first neural network may include generating an activity log including a history of activations of the neurons of the first neural network, the evaluating the performance of the first neural network architecture may include: measuring, based on the activity log, stress levels and scope in a plurality of cortical areas of the first neural network; and detecting a stressed cortical area of the cortical areas.

The evaluating the performance of the first neural network architecture may further include: determining that the stressed cortical area is under stress throughout an entirety of the stressed cortical area; and flagging the stressed cortical area for expansion.

The evaluating the performance of the first neural network architecture may further include: determining that the stressed cortical area is under stress in a local region of the stressed cortical area; and flagging the local region of the stressed cortical area for breaking into sub-areas.

The generating the updated computer-readable representation may include: identifying, from among the first plurality of genes of the first genome, a gene corresponding to the stressed cortical area; and modifying the gene corresponding to the stressed cortical area.

The gene corresponding to the stressed cortical area may include a numerical parameter, and the modifying the gene corresponding to the stressed cortical area may include applying a percentage change to the numerical parameter.

The generating the updated computer-readable representation may include: loading a second computer-readable representation of a second neural network architecture, the second computer-readable representation including a second genome; identifying a gene of the second genome corresponding to the stressed cortical area; and swapping the gene of the second genome with the gene of the first genome to generate a gene of the updated genome.

The input processing unit may include a plurality of pain detecting neurons configured to activate when an input signal exceeds a threshold, and the pain detecting neurons may apply inhibitory post-synaptic signals to connected neurons.

BRIEF DESCRIPTION OF THE DRAWINGS

The accompanying drawings, together with the specification, illustrate exemplary embodiments of the present invention, and, together with the description, serve to explain the principles of the present invention.

FIG. 5C is a flowchart of a method for integrating input processing units (IPUs) and output processing units (OPUs) with a connectome according to one embodiment of the present disclosure.

FIG. 6B is a graph depicting a function for synaptic weights in a variant of spike time dependent plasticity according to one embodiment of the present disclosure.

FIG. 6D is a conceptual view of how multiple memories are formed within a connectome and joined or merged according to one embodiment of the present disclosure to represent the same object.

DETAILED DESCRIPTION

Figure 1A:
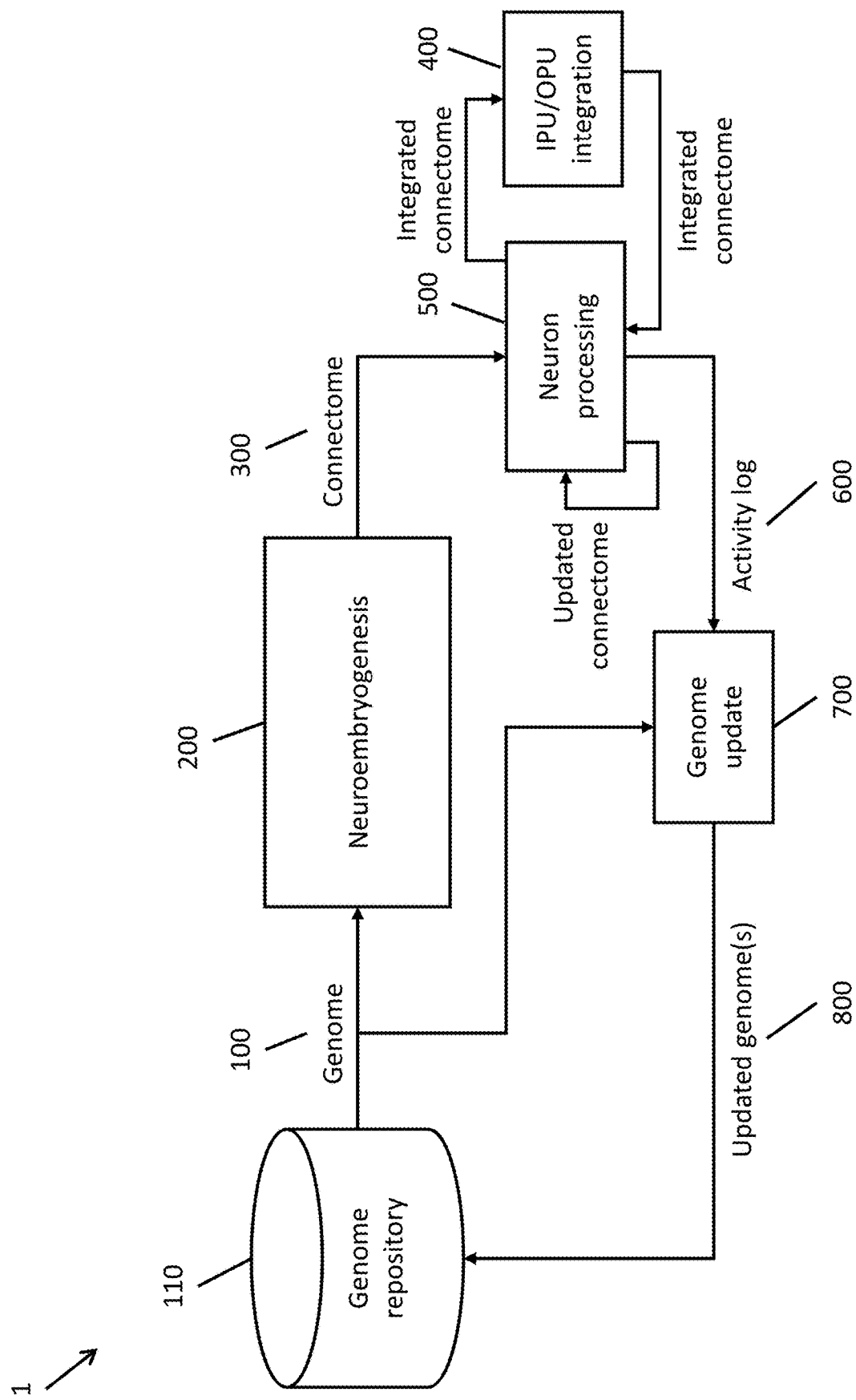
FIG. 1A is a block diagram depicting an overview of a framework for evolutionary artificial general intelligence according to one embodiment of the present disclosure.

In the following detailed description, only certain exemplary embodiments of the present invention are shown and described, by way of illustration. As those skilled in the art would recognize, the invention may be embodied in many different forms and should not be construed as being limited to the embodiments set forth herein.

Aspects of embodiments of the present disclosure relate to systems and methods for constructing an intelligent system that can automatically grow, scale, and adapt to its environment, including updating the architecture of the machine learning model in response to feedback from the environment or based on supplied training data.

In some circumstances, aspects of embodiments of the present disclosure will be referred to herein as a Framework for Evolutionary Artificial General Intelligence (FEAGI). FEAGI offers a framework that can help grow a functional artificial brain using predefined architectural properties and that is capable of automatically updating or evolving its architecture to produce improved models.

Aspects of embodiments of the present disclosure are built upon systems and methods for evolutionary artificial intelligence, such as those described in Nadji-Tehrani, Mohammad, and Ali Eslami. "A Brain-Inspired Framework for Evolutionary Artificial General Intelligence." *IEEE Transactions on Neural Networks and Learning Systems* (2020), and as described in Nadji-Tehrani, Mohammad. *A Brain-Inspired Framework for Evolutionary Artificial General Intelligence.* 2020. Wichita State University, PhD Dissertation, the entire disclosures of which are incorporated by reference herein.

Framework for Evolutionary Artificial General Intelligence

As noted above, some aspects of embodiments of the present disclosure relate to a Framework for Evolutionary Artificial General Intelligence (FEAGI), which includes systems and methods for specifying the architecture of a neural network in a computer-readable format, automatically constructing a neural network based on the specification, automatically training the neural network based on training data and/or exposure to a real-world or simulated environment, measuring the performance and behavior of the trained neural network, and automatically modifying or evolving the architecture based on the measured performance of the trained neural network to generate one or more updated specifications of architectures of neural networks in a compute readable format.

Many aspects of frameworks in accordance with embodiments of the present disclosure are inspired by biological phenomena, and may be referred to herein by the corresponding biological terminology, despite being implemented in electronic circuits, computer software instructions stored in one or more machine readable memories, and combinations thereof, such as instructions that configure a processing circuit to implement a purpose-specific algorithm. Some of these biologically inspired terms include:

Artificial Brain—a computing system including a combination of hardware (e.g., electronic processing circuits) and software working together to process internally-generated and externally-generated information, such as a computing system configured to operate as a Robot Control System.

Connectome—a data structure (e.g., centralized or distributed) and/or set of parameters that include a set of physical and/or logical structures defined by the data structure defining an artificial brain, where a processing circuit is configured to perform computations in accordance with the artificial brain defined by the connectome. The data structure may be centrally located within a single computing device or distributed among multiple computing devices (for example, each computing device storing only the parts of the connectome that is running on that particular computing device, such as vision functional areas of the connectome on one computing device and motor functional areas of the connectome on another computing device, as another example, the connectome may be hosted on distributed file system). These include, for example, the characteristics of artificial neurons in an artificial neural network and the synaptic connectivity between the neurons. In some embodiments, a connectome defines an Artificial Neural Network, including the activation functions associated with the artificial neurons in the artificial neural network, the arrangement of the artificial neurons into layers or blocks, and characteristics of the synaptic connections between the neurons of the artificial neural network (e.g., connections between the outputs of some neurons and the inputs of other neurons).

Genome—a data structure containing a set of properties needed to build a Connectome, which may also be referred to as a Neural Network Parameters File.

Genome repository—a distributed or centralized database housing a collection of genome instances, such as a database of configuration files or neural network parameters files.

Gene—a portion of the genome capturing the properties of a particular section of the artificial brain, such as a parameter among the various parameters defining an architecture of a neural network (e.g., activation functions used by particular neurons, parameters controlling which neurons can be connected together and the characteristics of those connections such as connection rates, connection ratios, and the like).

Cortical Area—A virtual space that includes a collection of neurons scattered within, for example, a Neural Network Layer having a collection of artificial neurons therein. In some embodiments, each artificial neuron is associated with a location within the virtual space or cortical area (e.g., a position within a coordinate system such as a 2-D or 3-D coordinate system).

Neurogenesis or the creation of a neuron—a process of reading neuron properties from the genome, creating an entry for the neuron in the connectome, and associating the neuron with a particular cortical area of the connectome.

Neuroembryogenesis—A collection of processes including, for example, cortical area creation, neurogenesis, and synaptogenesis that are executed, based on a genome, as part of a process for forming and developing data structures representing an artificial brain or connectome.

Synaptogenesis or the creation of neural network edges or connections between neurons—the process of reading, from a gene of the genome, rules of connectivity of a neuron to its neighboring neurons and creating or updating an entry in the connectome associated with the neuron to specify the connections between the neuron and its neighbors (e.g., which neighbors it is connected to, the strength of the connections, and the like).

Input Processing Unit (IPU)—a software program or other set of instructions for configuring a processing circuit to implement an interface between an input device or sensor (such as a microphone, a force sensor, a camera, a radar detector, a lidar detector, and the like) and the connectome by including a plurality of input neurons for translating the data (e.g., analog data or digital data) received from the input device to a set of neuronal stimulations corresponding to the signals transmitted between neurons of the connectome.

Output Processing Unit (OPU)—a software program or other set of instructions for configuring a processing circuit to implement an interface between the connectome and an output device (such as a speaker, a motor, an actuator, a switch, and the like) by including a plurality of output neurons for translating the neuronal signals at part of a specific region of the connectome to analog or digital data that control the output device.

Neuron Processing Unit (NPU)—a software program or other instructions configuring a processing circuit to implement operations associated with neuron firing (e.g., generation and transmission of signals) across the connectome.

Generally speaking, frameworks in accordance with embodiments of the present disclosure are used to train connectomes for operating in a particular use case, such as humanoid robots for health care. Various aspects of embodiments of the present disclosure are implemented using one or more processing circuits configured to perform operations in accordance with embodiments of the present invention. For example, in some embodiments, program instructions stored in one or more non-transitory computer-readable memories are used to configure one or more processing circuits (e.g., one or more central processing units or CPUs, one or more graphical processing units or GPUs, one or more field programmable gate arrays or FPGAs, one or more neuromorphic processors such as the SyNAPSE project TrueNorth chip, the SpiNNaker and Neurogrid chips, the Brain-inspired multiscale computation in neuromorphic hybrid systems (BrainScaleS) of the Electronic Vision(s) Group at the Kirchhoff-Institute for Physics and the Human Brain Project (HBP), application specific integrated circuits or ASICs, and/or the like) to operate as special-purpose hardware configured to specific-purpose operations in accordance with embodiments of the present disclosure. In some cases, different aspects of embodiments of the present disclosure, such as different stages of methods described herein, are implanted using different processing circuits which may have different methods of operation (e.g., computer systems with von Neumann architectures versus computer systems with neuromorphic hardware).

Figure 1B:
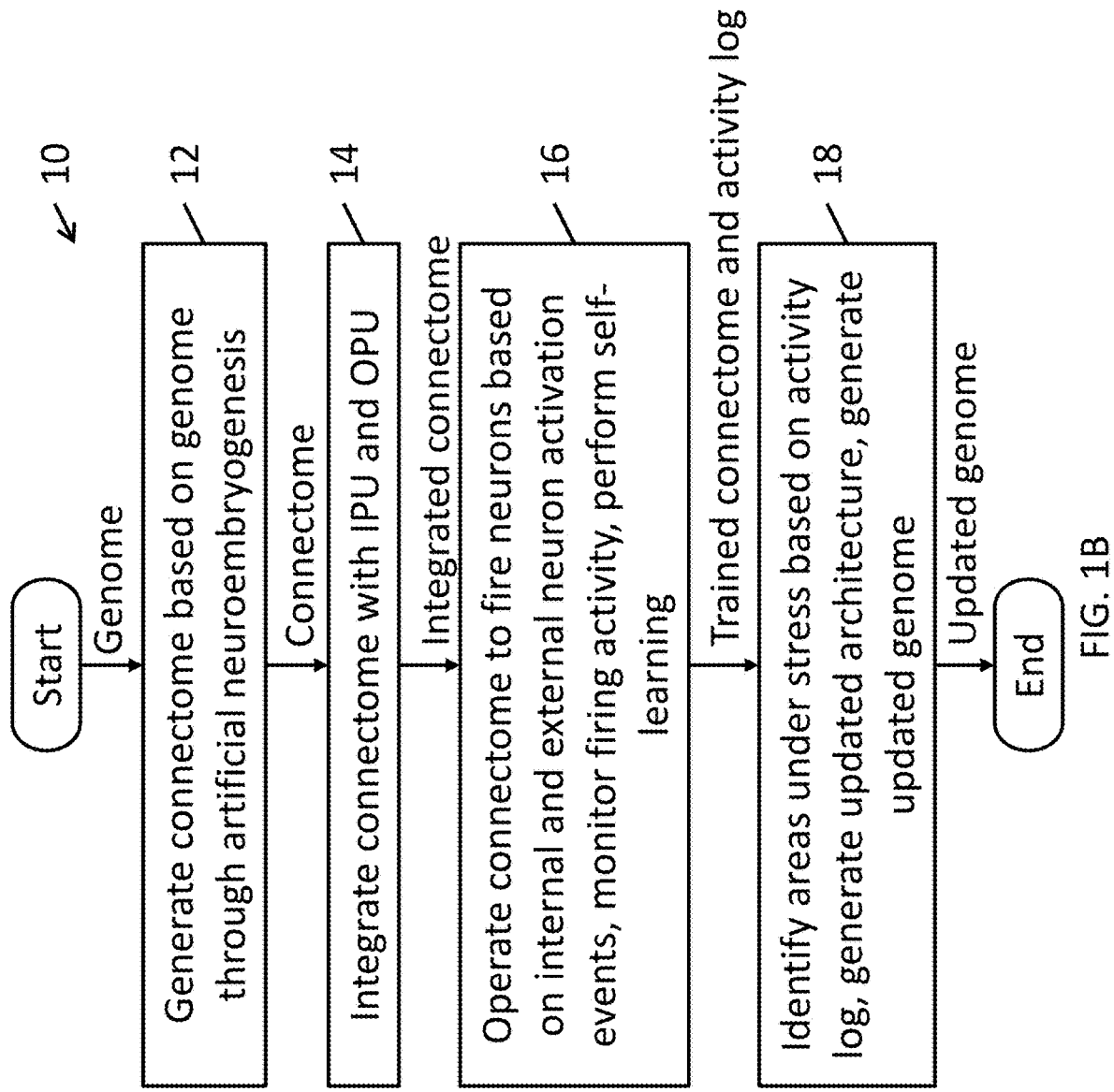
FIG. 1B is a flowchart depicting a method for training an artificial brain or artificial neural network according to one embodiment of the present disclosure.

FIG. 1A is a block diagram depicting an overview of a framework 1 for evolutionary artificial general intelligence according to one embodiment of the present disclosure. FIG. 1B is a flowchart depicting a method 10 for training an artificial brain or artificial neural network according to one embodiment of the present disclosure. As noted above, in various embodiments of the present disclosure, the components and/or modules of the block diagram of FIG. 1A, and various portions of the operations of the method shown in FIG. 1B are implemented in one or more processing circuits, such as electronic computer processors, configured (e.g., using instructions of a computer program or specially designed or configured in hardware) to perform the particular operations described herein.

Some aspects of embodiments relate to a genome-like data structure 100 that indirectly encodes the architecture of an artificial neural network as the genotype. The genome 100 may be loaded from a genome repository 110, which stores one or more different genomes specifying different architectures for an artificial neural network. The genome 100 is used to develop the artificial brain step-by-step by taking it through an artificial neuroembryogenesis process 12 using a neuroembryogenesis module 200 and storing the result in another data structure, or connectome 300, as a phenotype.

After performing the neuroembryogenesis process 12 to generate the connectome 300, the artificial brain is ready to receive stimuli from the outside world through one or more input processing units (IPUs) and passing the stimuli through the corresponding cortical layers (e.g., connections between neurons) defined by the connectome 300. In addition, the connectome 300 may act on the outside world through one or more output processing units (OPUs). These connections between the connectome 300 and various IPUs/OPUs are formed in operation 14 in a process that may be referred to herein as IPU/OPU integration 400.

The IPUs 320 convert the signals from the outside world (e.g., sensor data in the form of analog signals or digital signals, such as tactile or force sensors, cameras, microphones, and the like) into the same format of signals used within the connectome to communicate between neurons (e.g., neuron activations in the form of vectors of input digital values or spiking signals such as an analog spike train in the case of neuromorphic hardware).

As described in more detail below, in some embodiments, interneuronal communications within the simulated brain use an efficient burst-centric mechanism inspired by the sparsity of neuronal activities in the biological brain to help mitigate the need for highly parallel processing units and time-dependent complexities associated with it so that the artificial brain can leverage commodity hardware while simulating a highly parallel structure to achieve the desired functionality.

After being connected to one or more IPUs and, in some instances, one or more OPUs during IPU/OPU integration 400, the integrated connectome is provided to a neural processor or neuron processing unit 500 to interact with its environment via the IPUs and/or OPUs. In operation 16, the "neuron processing unit" (NPU) implements particular specialized operations to simulate behaviors such as neuron firing, neuroplasticity, and neuron aging within the connectome during operation, performing the generation and transmission of signals between the neurons of the connectome. The neuron processing unit 500 may monitor the level of activity within the integrated connectome and perform self-learning to update the connectome (e.g., generate an updated connectome) based on the firing (e.g., adjusting the weights or strength of the synaptic connections between neurons).

During the course of operation, the NPU 500 may generate or maintain a log or other information about the firing activity of neurons within the connectome, such as the number of times each neuron has fired and/or the number of times signals were sent along each of the synaptic connections. The log may correspond to a particular period of time, such as a time since the last update of the connectome, a time since the connectome was first provided to the NPU 500, or the like. The generated activity log 600 may be provided to an evolutionary module or genome update module 700, which is configured to generate, in operation 18, one or more new genomes or updated genomes 800 based on the genome 100 that was used to generate the connectome 300 running on the NPU 500 in accordance with information about the activity of various neurons and synaptic connections within the connectome 300, as reflected in the activity log 600. These updated genomes 800 may then be stored in the genome repository 110 for use in generating new connectomes from the updated genomes 800, where the updated genomes 800 reflect development or learning from the outside environment by a connectome 300.

Turning to the components of frameworks in accordance with embodiments of the present disclosure in more detail, a genome according to some embodiments of the present disclosure is or includes a computer-readable data structure that defines the architecture of an artificial brain such as an artificial neural network. In some embodiments, a genome data structure is a hierarchical data structure using a notation such as JavaScript Object Notation (JSON), Extensible Markup Language (XML), symbolic expressions (s-expressions), key-value mapping data structures (e.g., JavaScript objects, JavaScript maps, Python dictionaries, tree-based or hash-based maps, etc.), or the like. Using a computer-readable and computer-modifiable data structure for representing the architecture of an artificial brain enables the automatic update of the architecture using genetic algorithms, as described in more detail below, and is used to capture information needed to be able to build and rebuild a functioning artificial brain. In some embodiments, the genome encodes anatomical properties inspired by biological brains—including cortical geometry, neuron density, neuron morphologies, growth rules, and orientation selectivity—as well as function variables driving the brain physiology—including firing threshold, plasticity constant, refractory period, leak coefficient, and maximum consecutive firing threshold—as genotypes using indirect encoding (see, e.g., J. Clune, B. E. Beckmann, C. Ofria, and R. T. Pennock, "Evolving coordinated quadruped gaits with the hyperneat generative encoding," in *Proceedings of the IEEE Congress on Evolutionary Computation*, Trondheim, Norway, May 2009, pp. 2764-2771).

Figure 2:
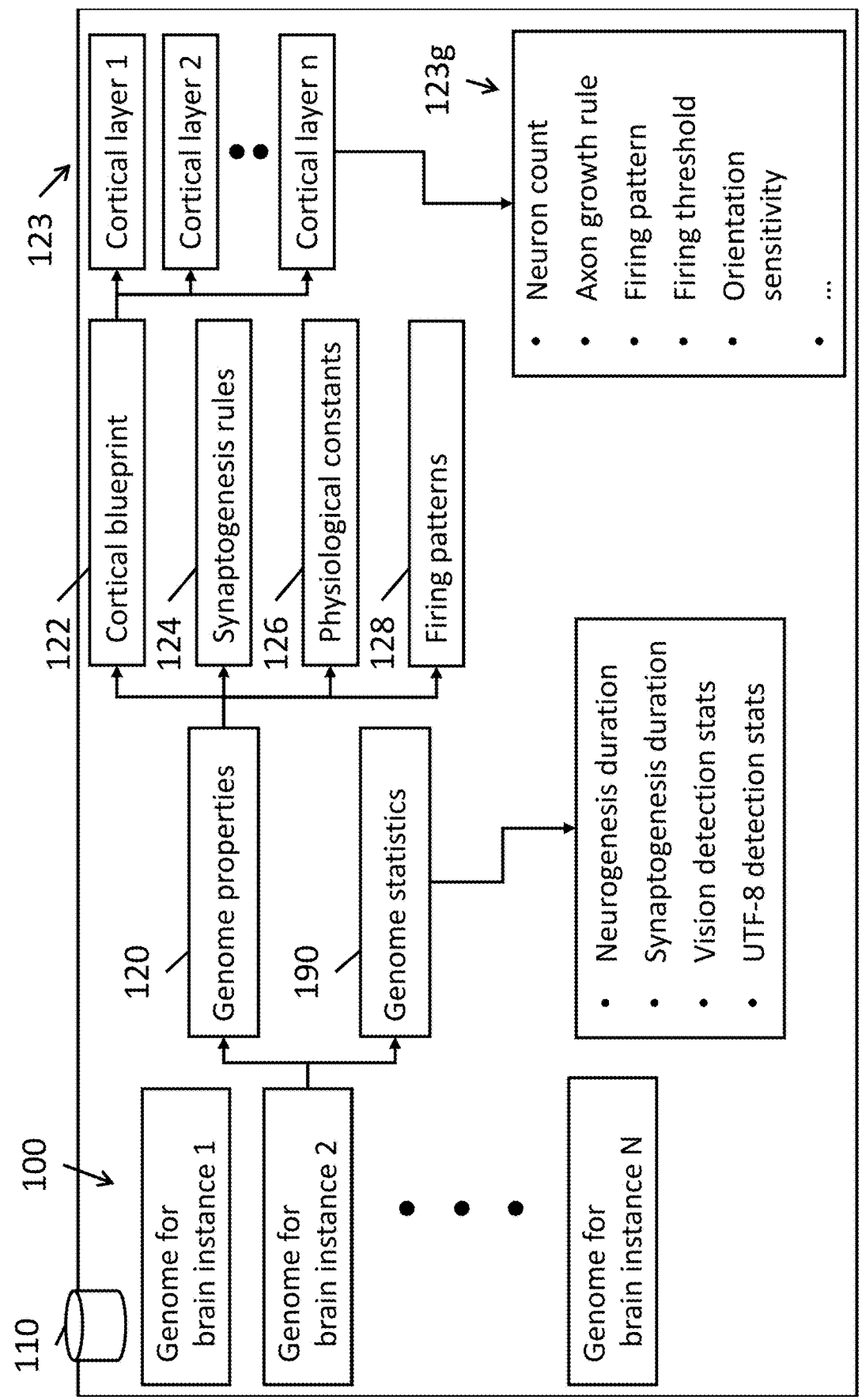
FIG. 2 is a schematic depiction of a genome in a genome repository according to one embodiment of the present disclosure.

FIG. 2 is a schematic depiction of a genome in a genome repository according to one embodiment of the present disclosure. In more detail, FIG. 2 depicts the hierarchy of a genome database or genome repository 110 and the hierarchy of the genes within an individual genome 100 in the genome repository 110. Each genome 100 in the genome represents the structure for a particular artificial brain instance. FIG. 2 depicts an expanded view of genes or parameters stored within a genome 100 for "brain instance 2." According to some embodiments, for each genome instance or genome 100, there are two main sets of information captured: one set of information, categorized as genome properties 120 captures all parameters needed to regrow a new artificial brain; the second set, categorized as genome statistics 190 captures the artificial brain's performance and behavior during its lifetime. Examples of particular genes of the genome properties 120 and the genome statistics 190 will be described in more detail below in the context of their roles in, for example, neuroembryogenesis 200 and genome update 700.

The genome is read using the neuroembryogenesis unit 200 and translated into cortical regions, cortical layers, neurons, and synapses between neurons as a phenotype that is stored in the connectome 300.

The connectome 300 is the "phenotype" created as a result of passing the genome through the artificial neuroembryogenesis process 200. In some embodiments, the connectome 300 is represented using an object-oriented data structure to support scalability requirements when the implementation reaches larger scales. The connectome contains information on individual cortical areas, cortical layers, neurons, neuron locations, synapses between neurons, and connection strengths. In some embodiments, the neuroembryogenesis process ignores anatomical structures that play a supportive role for the neurons in a biological brain such as the circulatory system, ventricles, meninges, and glial cells, but where explicit modeling in an artificial brain may provide limited, if any, benefit in performance.

In some embodiments of the present disclosure, the neuroembryogenesis module 200 is configured to orchestrate a simplified version of a corresponding biological process of "neurulation," by reading instructions from the genome, generating phenotypes in accordance with the instructions, and recording the phenotypes in the connectome 300. This process generates a connectome 300 based on the supplied genome 100 that may include, for example, neurons arranged into cortical areas, layers, and/or sublayers, and synapses representing the connections between the neurons.

Figure 3A:
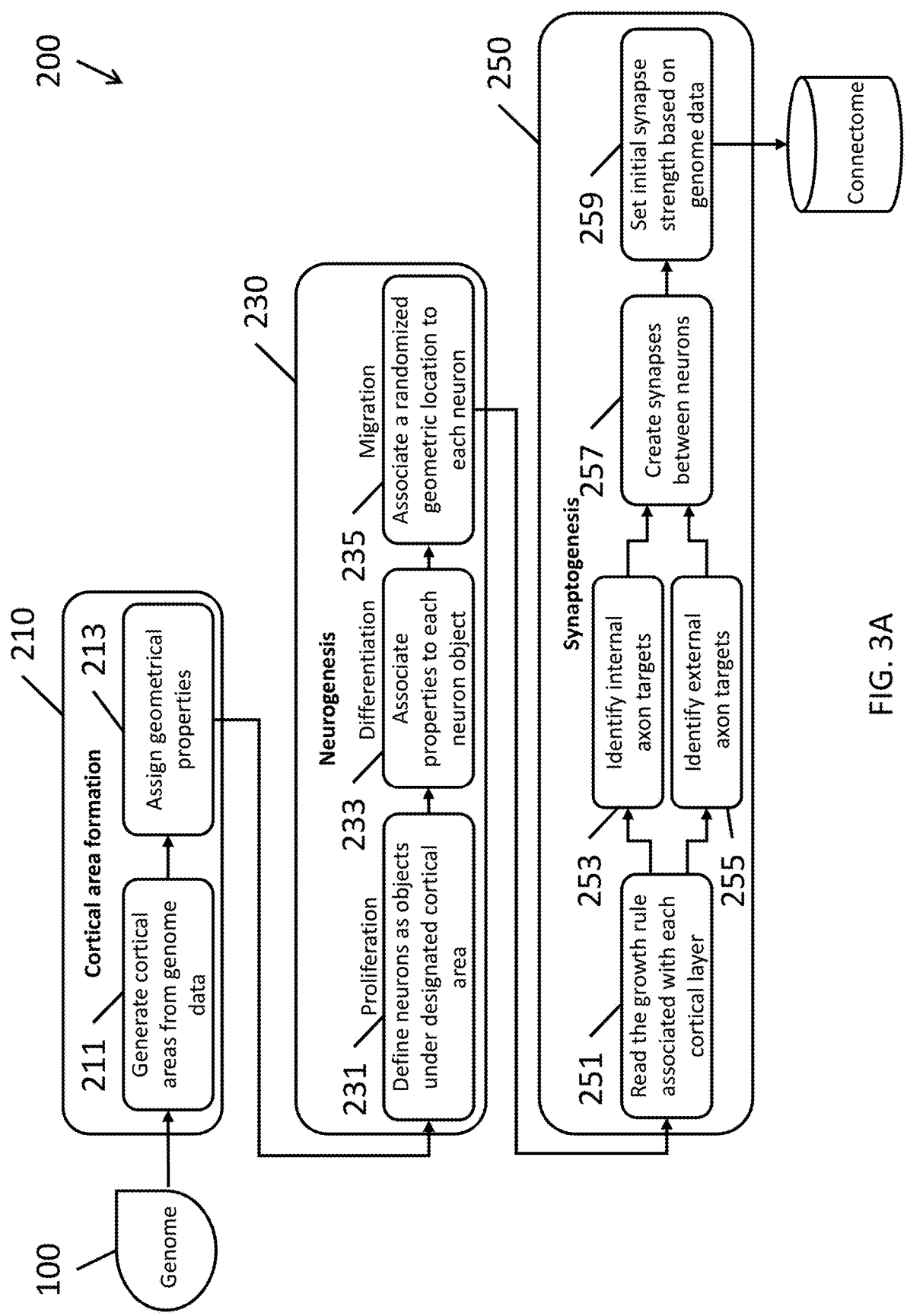
FIG. 3A is a schematic block diagram of a neuroembryogenesis unit according to one embodiment of the present disclosure.
Figure 3B:
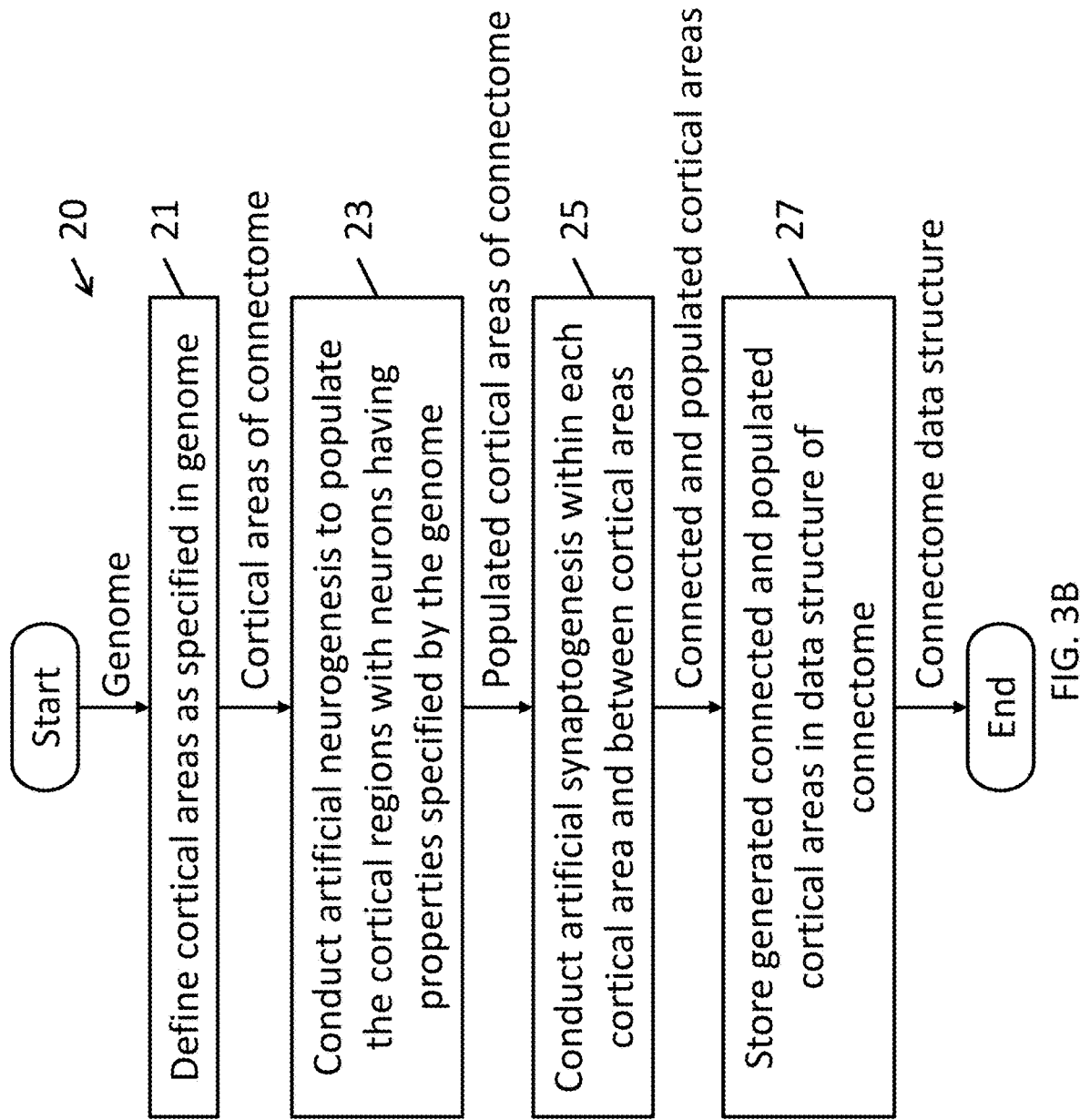
FIG. 3B is a flowchart of a method for generating a connectome based on a genotype according to some embodiments of the present disclosure.

FIG. 3A is a schematic block diagram of a neuroembryogenesis unit according to one embodiment of the present disclosure. FIG. 3B is a flowchart of a method 20 for generating a connectome based on a genotype according to some embodiments of the present disclosure.

The neuroembryogenesis module 200 includes a collection of sub-modules configured to decode the input genome 100 and to construct the connectome 300. According to some embodiments of the present disclosure, in operation 21 a cortical area formation sub-module 210 defines functional cortical areas of the connectome 300. In some embodiments, every functional cortical area includes of multiple regions and subregions. As one example, a genome 100 may define an artificial neural network that includes a portion modeled after the ventral visual pathway of a human brain, and therefore the genome 100 may define cortical areas corresponding to V1, V2, V4, and inferior temporal cortex (IT), and may define various subregions for region V1 to accommodate the presence of various cortical layers. Accordingly, in some embodiments of the present disclosure, the cortical area formation sub-module 210 generates cortical areas in accordance with the genome data. In particular, as seen in FIG. 2, the genome properties 120 of the genome 100 includes a cortical blueprint 122, definitions of n different cortical layers 123 of the connectome. Each of the cortical layers 123 may include one or more parameters (or "genes") 123g defining the characteristics of that cortical layer 123. In the example shown in FIG. 2, the parameters 123g include: neuron count (e.g., number of neurons in the cortical layer); axon growth rule (e.g., rules for how the outputs of the neurons can connect to other neurons, such as in a virtual 3-D space, where every neuron is assigned a three-dimensional position within a three-dimensional volume of its cortical layer or cortical region); firing pattern (e.g., the patterns of signals generated by the neurons, such as patterns of spike trains generated by neurons in a spiking neural network), firing threshold (e.g., conditions under which a neuron will fire or generate an output signal based on its input signals); orientation sensitivity (e.g., in the case of modeling a visual system, whether the neurons are sensitive to orientation of patterns or lines in the visual input received from an IPU, in a manner modeled after biological neurons that are sensitive to particular orientations of patterns and/or lines), and the like.

As another example, a genome 100 may define an architecture corresponding to a deep neural network such as a convolutional neural network, where the cortical layers may correspond to different layers of the deep neural network (e.g., fully connected layers, convolutional layers, pooling layers, etc.), and where the parameters may define, for example, the sizes or dimensions of the layers, the sizes or dimensions of convolutional kernels, the activation functions used by the various neurons, the connections between different layers (including, e.g., skip connections, recurrent connections, etc.), and the like.

In some embodiments, in operation 21 of FIG. 3B, the cortical area formation module 210 forms these cortical areas by generating 211 a data structure or data structures within the connectome 300 or generating nodes in a hierarchical data structure of the connectome 300 based on the genome data (e.g., including the genes associated with the cortical layers 123 of the cortical blueprint 122 in the genome 100). In some embodiments, where spatial relationships and/or a geometry is an aspect of the architecture of the artificial brain, the cortical area formation module 210 also assigns geometrical properties 213 to the cortical areas, such as by specifying the location of each cortical areas (e.g., defined by a collection of 2-D coordinates or a collection of 3-D coordinates defining a space within a coordinate system).

After defining the cortical areas in operation 21, the neuroembryogenesis module 200 populates the cortical areas of the connectome with neurons using the neurogenesis sub-module 230 in operation 23. In some embodiments of the present disclosure, the neurogenesis sub-module 230 performs operations modeled after similar stages in a biological brain, including neuron proliferation, migration, and differentiation.

For example, in some embodiments of the present disclosure, a neuron count or a neuron density for each cortical layer is read to determine the number or the density of neurons in a given cortical area. During an operation 231 generally corresponding to "proliferation" in a biological brain, neurons are added to the connectome data structure within the portions of the data structure corresponding to the cortical layer. For example, in the case of a JSON representation of a neural network architecture, each neuron may be added as a JSON object within a parent JSON object corresponding to the cortical layer that the neuron lies within (e.g., in a field of the cortical layer corresponding to an array of neurons). In operation 233 generally corresponding to "differentiation" in a biological brain, the neurogenesis sub-module 230 associates neuron properties in the form of key-value pairs to each neuron object inherited from the corresponding cortical layer. In some embodiments, these properties relate to the behavior of the neuron, such as firing patterns, initial weights, activation functions, and the like. For example, the properties may be used to configure a given neuron to use a "leaky integrate-and-fire" model, a "non-leaky integrate-and-fire" model, an "adaptive integrate-and-fire" model, as well as parameters controlling the behavior of these models. In operation 235 generally corresponding to "migration" in a biological brain, the neurogenesis sub-module 230 assigns each neuron a fixed location within the cortical layer in the form of [x, y, z] coordinates within the geometry of the cortical region defined in operation 213.

While some embodiments of the present disclosure are described above in which the neurogenesis sub-module 230 performs operations modeled after similar stages in a biological brain such as neuron proliferation, migration, and differentiation, embodiments of the present disclosure are not limited thereto. In some embodiments using different types of neural networks, analogous neurogenesis operations may be performed to generate neurons defined in by the architecture specified in the genome 100. For example, in the case of a classical artificial neural network, a neurogenesis operation 23 may generate neurons by, for example, initializing vectors of parameters (e.g., weights) representing layers of neurons in a neural network (e.g., where the propagation of signals through the classical artificial neural network may involve performing vector or matrix multiplication between activations of a previous layer and weights of a current layer, and element-wise application of an activation function such as ReLU to the products).

After populating the cortical areas of the connectome with neurons in operation 23, the neuroembryogenesis module 200 connects the neurons together using the synaptogenesis sub-module 250 in operation 25.

In a biological brain, neighbor identification is used in the process of synaptogenesis. An axon's growth in a biological brain is guided step-by-step through molecular cues, with some being attractive and others repulsive. Sometimes axons travel very long distances and find their targets with high precision. Axon projections from one cortical layer to another or from one region to another are responsible for shaping the connections within the neural network, how data is passed along the cortical pathways, and how information is processed within a brain, whether artificial or biological.

Accordingly, in some embodiments of the present disclosure, the synaptogenesis sub-module 250 performs operations inspired by synaptogenesis in biological brains based on neuron morphologies.

Figure 4A:
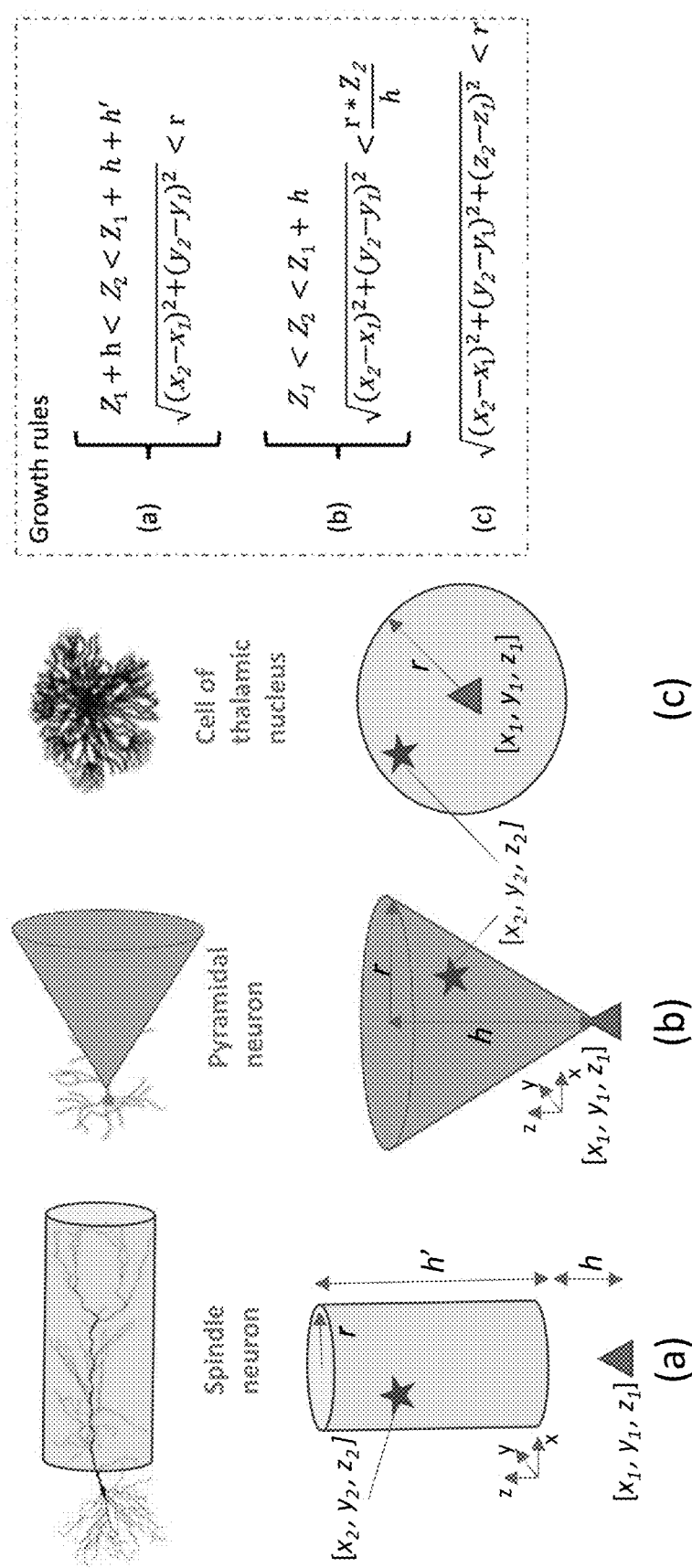
FIG. 4A is a schematic diagram depicting the geometrically-defined spaces in which an axon of a source neuron can find its destination neuron according to some embodiments of the present disclosure.

FIG. 4A is a schematic diagram depicting the geometrically-defined spaces in which an axon of a source neuron can find its destination neuron according to some embodiments of the present disclosure. FIG. 4A depicts examples of growth rules as geometrical formulas defining spaces in which axons of source neurons can find destination neurons, defined in cartesian coordinates and inspired by morphology of biological neurons. Referring to FIG. 2, the growth rules may be stored in the genome 100 as genes for the individual cortical layers 123 and/or as part of a collection of synaptogenesis rules 124 among the genome properties 120. In FIG. 1, a source neuron is indicated by a triangle and has coordinates represented by $[x_1, y_1, z_1]$ and a potential destination neuron is indicated by a star and has coordinates represented by $[x_2, y_2, z_2]$. FIG. 4A shows three examples of growth rules: growth rule (a) defines a cylindrical synaptogenesis region into which the destination neuron coordinates can fall, where h is neuron's distance from the cylinder's base, h' is the height of the cylinder, and r is the radius of the cylinder; growth rule (b) simulates a cone-shaped synaptogenesis region similar to that occupied by a pyramidal neuron's axons, where h is height of the cone and r is the radius of its base; and growth rule (c) represents spherically-shaped synaptogenesis region with axon length reaching maximum r as the sphere's radius.

Figure 4B:
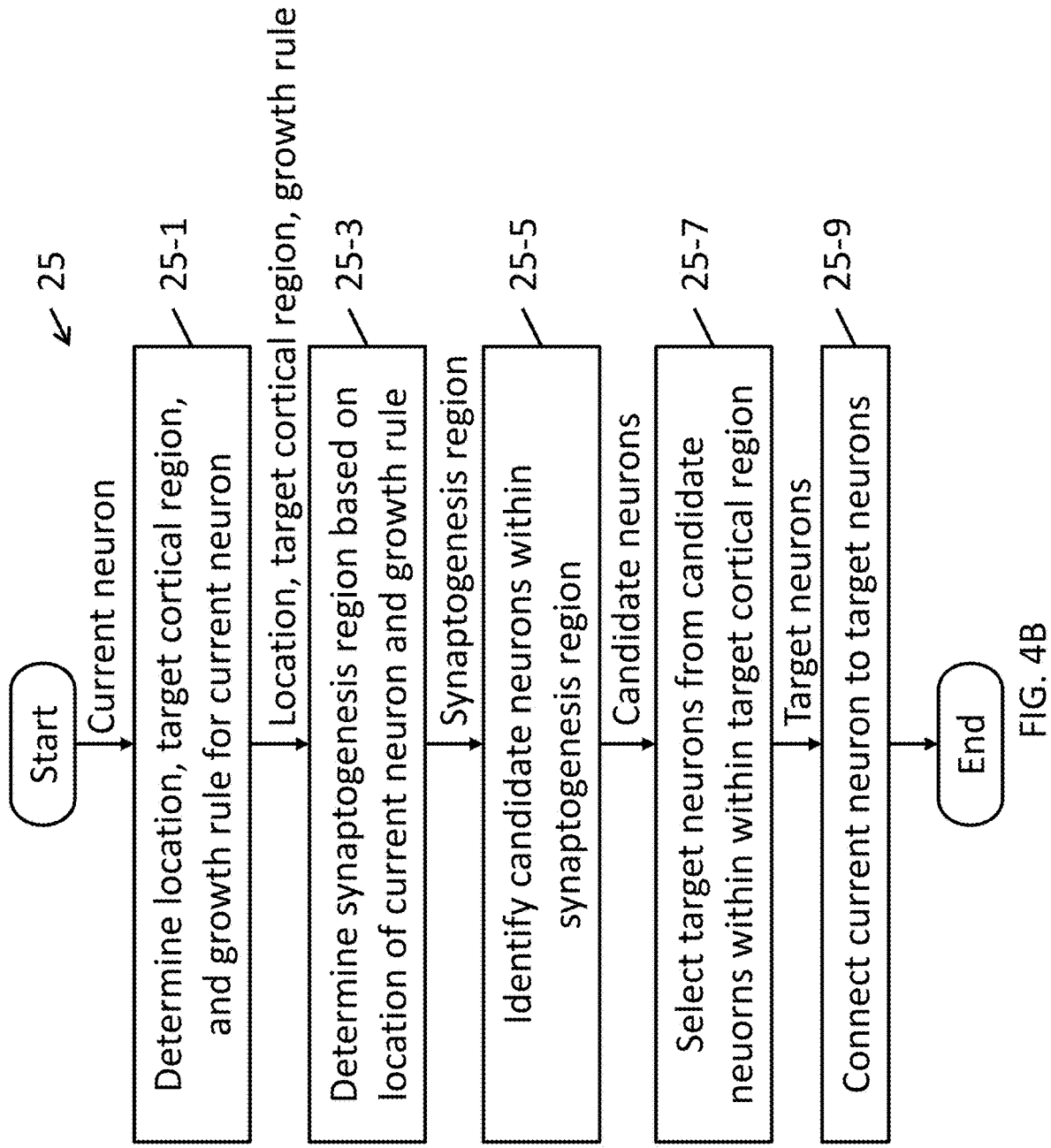
FIG. 4B is a flowchart of a method for performing synaptogenesis for one neuron according to one embodiment of the present disclosure.

FIG. 4B is a flowchart of a method 25 for performing synaptogenesis for one neuron according to one embodiment of the present disclosure. In operation 251 as shown in FIG. 3A and in operation 25-1 as shown in FIG. 4B, the synaptogenesis sub-module 250 reads the location of the source neuron, the target cortical region (or regions), and growth rule applied to the neuron from the genome 100, e.g., the axon growth rule specified in the genes for the cortical layer 123 that contains the current neuron. The synaptogenesis operation may be applied to all of the neurons in the connectome 300 to connect identify internal axon targets within the same cortical area in operation 253 (when the target cortical area is the same cortical area as the current neuron) and external axon targets in different cortical areas in operation 255 (when the target cortical area is a different cortical area from the current neuron), as shown in operation 25 of FIG. 3B.

In more detail, and referring to FIG. 4B, in operation 25-3, the synaptogenesis sub-module 250 uses the growth rule helps to determine a synaptogenesis region based on the location of the source neuron or current neuron (e.g., coordinates $[x_1, y_1, z_1]$) the growth rule associated with the source neuron or current neuron (e.g., cylindrical, conical, spherical, or the like), and parameters specified by the genes (e.g., the size of and of the synaptogenesis region and its distance from the current neuron). In operation 25-5, the synaptogenesis sub-module 250 identifies candidate neurons that lie in an intersection of the target cortical region and the synaptogenesis region defined by the growth rule. In operation 25-7, the synaptogenesis sub-module 250 selects a subset of neurons from the plurality of candidate neurons that the axon of the current neuron will connect to. For example, in some embodiments, the synaptogenesis sub-module randomly selects n neurons from the candidate pool, where n is a parameter defined in the genome for the current neuron's cortical region. In some embodiments, the selection may be weighted based on various parameters (e.g., a probability based on distance from the current neuron). In operation 25-9, the synaptogenesis sub-module 250 connects the output of the current neuron to the inputs of the target neurons, such as by updating the entry for the current neuron in the connectome 300 to include the target neurons as targets (e.g., based on uniquely assigned neuron identifiers) of its outputs along with synaptic weights.

Accordingly, aspects of embodiments of the present disclosure provide a framework for guiding axons to their destinations in a manner similar to how biological neurons find their own destinations. Parameters associated with these rules are included in the genome 100 of the artificial brain so these parameters can be updated and evolved, as discussed in more detail below with respect to the genome update module 700.

In some embodiments of the present disclosure, the IPU/OPU integration module 400 integrates one or more input processing units (IPUs) and output processing units (OPUs) with the connectome 300 constructed by the neuroembryogenesis module 200. Input and output processing units provide interfaces between the artificial brain and the outside world. Input processing modules are designed to receive raw data from various input modalities and convert the raw data into forms that are suitable to be fed to the cortical pathways of the connectome 300 in the form of neuron stimulations. Similarly, to be able to understand the output signals of an artificial brain (either by humans or a computer), output processing units convert neuronal activities into signals (e.g., control instructions) corresponding to output devices. Accordingly, IPUs and OPUs may be compared to device drivers and hardware interfaces for peripherals in a computer operating system.

A biological brain receives information from a peripheral nervous system connected to various receptors such as photoreceptors, thermoreceptors, chemoreceptors, and mechanoreceptors. Similarly, in a FEAGI according to some embodiments of the present disclosure, every input processing unit/output processing unit (IPU/OPU) may differ in how information is collected, encoded, and presented to the first cortical layer as part of a particular functional cortical pathway. As an example, for visual information, some embodiments of the present disclosure relate to an IPU that is configured to convert the image of a given object to its fundamental elements such as color and brightness while maintaining the pixel arrangements, similar to the retinal information-processing structure in a biological eye. The human eye collects optical information using photoreceptors and passes it through an assortment of cells before forwarding it to the thalamus via ganglion cells. Additional mapping occurs through the six layers of the lateral geniculate nucleus (LGN) within the thalamus. In some embodiments of the present disclosure, the visual IPU plays the same role as the retina to perform some initial processing of the data (such as converting a bitmap color image received from a camera into spiking signals), and the rest of the processing activities are handed off in the form of neuronal stimulation to portions of the connectome 300 representing the cortical pathways, to be processed by the neuron processing unit 500.

Some aspects embodiments of the present disclosure relate to a vision IPU inspired by two characteristics of biological vision systems. The first characteristic is based on how neuron projections in biological brains maintain their position fidelity against their neighbors as they project from the retina to LGN, and from there to the striate cortex. The second characteristic corresponds to how horizontal cells with dendrites spanning sideways collect information from neighboring neurons.

Figure 5A:
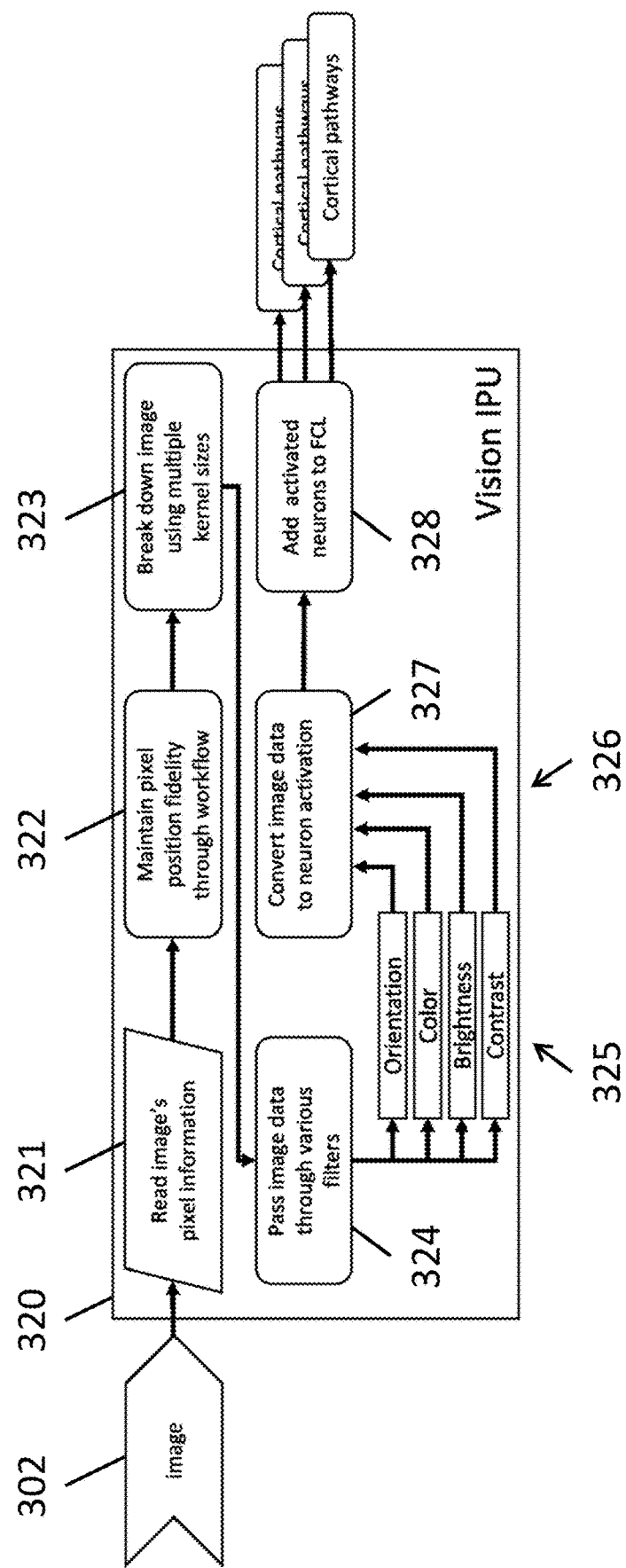
FIG. 5A is a block diagram depicting a vision input processing unit (IPU) according to one embodiment of the present disclosure.

FIG. 5A is a block diagram depicting a vision IPU 320 according to one embodiment of the present disclosure. A vision IPU 320 according to some embodiments of the present disclosure is configured to read in an input image 302 received from a camera (or other imaging device) in operation 321 and maintain the pixel position fidelity through the processing workflow 322, and apply a kernel convolution matrix in operation 323 by which one or more small-size (e.g., a 3×3) matrices (or convolutional kernels) are used to scan over the input image 302. By choosing different convolutional kernels and by filtering the image data in operation 324 through various filters 325, this process breaks down the input image into fundamental components (or channels) 326 such as orientation, color, brightness, and contrast. In operation 327, the vision IPU 320 converts the image data from the various channels 326 into a format corresponding to those used for neuron activation in the implementation of the connectome 300, such as spike trains of spiking signals in the case of a spiking neural network, vectors or matrices of activation values in the case of classical convolutional neural networks, and the like. In operation 328, the vision IPU 320 generates the activations that were formatted in operation 327 so that the activations can be injected into the connectome 300. For example, in the case of a neuron processing unit that maintains a firing candidate list (FCL) of neurons to be activated, the vision IPU 320 adds the neurons that we activated by the processing of the input image 302 to the FCL. As another example, in the case of generating analog spike trains for an implementation using analog spiking neural networks, the vision IPU 320 may drive one or more digital-to-analog converters (DACs) to generate analog signals corresponding to the spiking signals. As a third example, in the case of a classical convolutional neural network, the vision IPU 320 may supply the generated matrix or matrices of activations (e.g., a vector of floating point or integer values) as input to a particular layer of a classical deep neural network.

While one example of an IPU as a vision IPU configured to process input images is presented above, embodiments of the present disclosure are not limited thereto. Embodiments of the present disclosure also include other types of IPUs for converting other types of sensor input into signals compatible with a connectome 300 running on a neuron processing unit 500 according to embodiments of the present invention. For example, an audio IPU may be configured to receive audio input in the form of audio data received from a microphone, such as a stream of samples of audio in the form of pulse-code modulation. Accordingly, various digital signal processing operations may be performed on the input audio data, such as a fast Fourier transform (FFT), band-pass filtering, and the like, may be used to generate multiple channels of output data based on the input audio data. These channels of output data are then converted into a format suitable for representation in the connectome 300 (e.g., analog spike trains, matrices of activations, and the like) to be supplied as input to particular portions of the connectome 300.

The process of decoding memory back to output processing unit first requires proper neuron wiring from the memory region to an output processing unit (OPU), which is driven by the genome 100. The second step is the decoding of neuron signals received from its corresponding memory unit to the actual physical signal needed to interact with systems that are external to the artificial brain. As one illustrative example, an OPU for outputting UTF-8 characters is described below. However, embodiments of the present disclosure are not limited thereto, and other OPUs may be configured to generate other types of outputs, such as for displaying graphics on a screen, controlling motors and actuators, generating audio signals to be played through a speaker system, and the like.

Unicode Transformation Format—8-bit (UTF-8), by definition, is a character mapping between distinct characters and their unique IDs or codes (e.g., the character '3' is mapped to code 0033, the character 'A' is mapped to code 0041, the character 'a' is mapped to code 0061). An OPU module for outputting UTF-8 characters in some embodiments includes a cortical region where various neurons are correlated with each of the target UTF-8 characters. A genome for producing such an OPU module may include a portion that encodes that cortical region as a one-dimensional array of neurons where the activation of each neuron in that cortical region corresponds to a particular different UTF-8 character (e.g., a first neuron for the character 'a', another neuron for the character 'b', another neuron for the character '1', etc.). In other embodiments, the neurons may be arranged in a two or three dimensions, and a cluster of neurons is designated for each such mapping to a UTF-8 character. Each of the designated neurons or neuron clusters can be identified with a location tag, and each location tag is mapped to a distinct UTF-8 identifier, such that the activation of neurons associated with a particular location tag indicates the output of a corresponding UTF-8 character by the OPU. In some embodiments, the mapping between the particular neurons or neuron clusters to particular UTF-8 characters is performed as part of the OPU. In some embodiments, the mapping between the particular neurons or neuron clusters to particular UTF-8 characters is performed by the middleware 350, as described in more detail below.

The same concept can be extended to any other complex output. As an example, an OPU configured to display visual data on a screen in some embodiments may include a two-dimensional array, where each cell of the array corresponds to a different pixel of an output image. Each cell of the array may include a single neurons or a cluster of neurons. In some embodiments, the two dimensional array of the OPU for displaying visual data is defined through a corresponding part of a genome and manifested through the connectome, where each neuron or neuron cluster has a distinct identifier that is mapped (e.g., algorithmically mapped) to a corresponding pixel in an image and/or on a physical display device. Furthermore, by having three two-dimensional layers in such architecture, multi-channel images (e.g., red, green, and blue color images) can be presented by each layer leading to display of a multichannel (e.g., color) image. In some embodiments, the mapping between the particular neurons or neuron clusters to particular outputs (e.g., particular pixels in an output image or frame buffer) is maintained in a part of the OPU. In some embodiments, the mapping between the particular neurons or neuron clusters to particular outputs is maintained as part of the middleware 350.

Figure 5B:
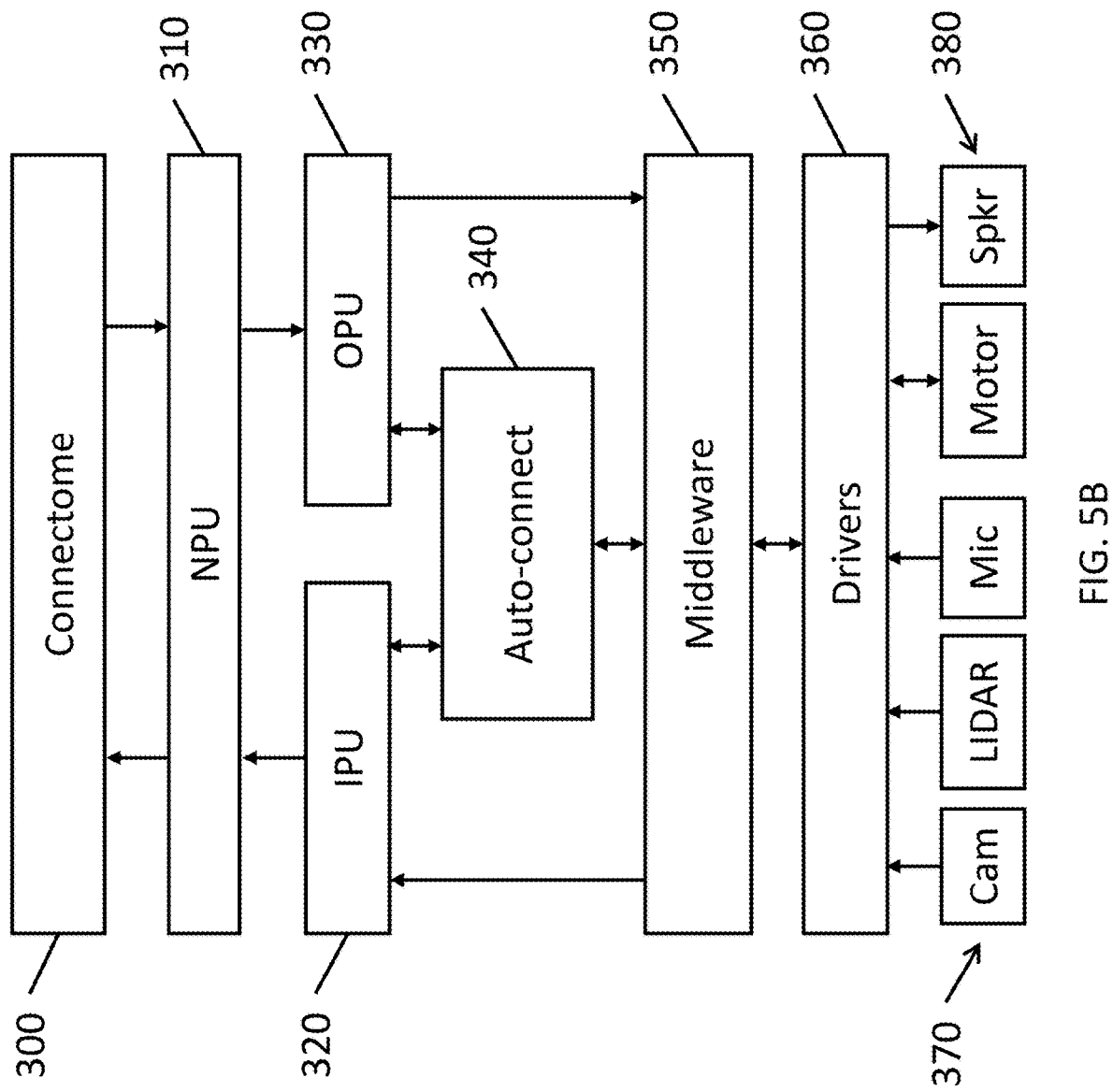
FIG. 5B is a block diagram depicting a connectome integrated with an IPU and an OPU along with input and output devices according to one embodiment of the present disclosure.

FIG. 5B is a block diagram depicting a connectome integrated with an IPU and an OPU along with input and output devices according to one embodiment of the present disclosure. FIG. 5C is a flowchart of a method 401 for integrating input processing units (IPUs) and output processing units (OPUs) with a connectome according to one embodiment of the present disclosure. In some embodiments of the present disclosure, the method 401 is implemented by the IPU/OPU integration module 400 as shown in FIG. 1A.

As shown in FIG. 5B, a connectome (e.g., as generated by the neuroembryogenesis module 200 in accordance with a genome 100) may be connected to an IPU 320 and an OPU 330 through a neuron processing unit (NPU) 310 (which may correspond to neuron processing unit 500 in other portions of this document). In some embodiments, a single IPU 320 is shared between all input devices 370 and a single OPU 330 is shared between all output devices 380, but embodiments of the present disclosure are not limited thereto—for example, separate IPUs may be used for different types of input devices (e.g., cameras versus microphones), where some types of input devices may share IPUs (e.g., different types of cameras such as color cameras and infrared cameras), and separate OPUs may be used for different output devices (e.g., motors versus speakers). In operation 410, for each input or output type such as visual (e.g., camera), sound (e.g., microphone), tactile, or motor, define a corresponding IPU/OPU to conduct translation between data/instruction to spike and vice versa. In operation 430, an auto-connect module or agent 340 is launched in a main operating system of a computer system that the input and output devices 370 and 380 are connected to and that interface with through device drivers 360 via middleware 350. The middleware 350 provides an interface between the spiking signals used for processing in the IPU 320 and the OPU 330 and the types of messages, commands, function calls, and the like that may be used within a host computing system. In some embodiments, the middleware 350 includes robotics middleware software (e.g., the Robot Operating System (ROS™) produced by the Open Source Robotics Foundation, Inc.) to provide an abstraction layer between the types of sensors, actuators, and the like that are used in robotics systems. For example, an OPU for controlling a motor (a "motor OPU") may function at the level of commands such as "move forward," "move backward," and "movement power," in the sense that the spiking activity of different neurons or clusters in the OPU correspond to the different possible commands output by the OPU 330. On the other side, a physical motor 380 connected to a hardware controller with a set of hardware drivers 360 translates low-level software commands to particular motor inputs (e.g., particular voltages across the terminals of the motor) or read feedback information from the motor (e.g., measured motor speed, measured electrical current flowing through the motor). The middleware 350 acts as a bridge or translator between the spiking signal based representations output by the OPU 330 and the host system's representations (e.g., low-level software commands such as function calls, commands, messages, and the like) for interacting with the driver 360 for controlling the motor. In some embodiments, the middleware 350 includes a library or application programming interface specifying the various possible actions supported by the hardware (e.g., sensors 370 and actuators 380) includes corresponding software libraries for interfacing with the low-level drivers 360 for the hardware (e.g., translating between the semantic commands such as "move forward," "move backward," and "movement power" to the particular driver-level software commands).

As one example of the operation of the middleware 350 as a translator or bridge, middleware modules for output devices translate from spiking signals in the OPU 330 to commands for controlling output devices. As one example, in the case of controlling a motor as discussed above, various neurons may influence the output of the "move forward," "move backward," and "movement power" commands. In the case of multiple conflicting signals (e.g., different neurons concurrently signaling "move forward" and "move backward" during a same burst cycle), the middleware module resolves the conflict between the spiking signals, such as by computing an average or by performing an action based on the direction that has the higher activity (e.g., through majority voting).

Another example of the operation of the middleware 350 as a translator or bridge will be described herein in the context of black and white (e.g., monochrome) video received from a camera input device. Monochrome video may be interpreted as a sequence of frames of images that are delivered from the camera at a particular frame rate (e.g., 24 frames per second (fps), 30 fps, 60 fps, etc.), and where each frame of data may be interpreted as a two dimensional array of pixel intensity values (e.g., brightness at each pixel in the image). Accordingly, a middleware module running in the middleware 350 may be used to translate the frames of images into spiking signals suitable to be supplied as input to the IPU 320. As one example, the IPU 320 may include a visual input layer of neurons arranged in a two-dimensional grid, where neurons within the grid are mapped to corresponding portions (or locations) of the image frame (e.g., where the middleware module maps intensities of pixels in the image to neurons in corresponding portions of the two-dimensional grid). In various embodiments, the middleware module translates the values of the pixels of the image frame into spiking signals in different ways, such as by: activating (e.g., sending spiking signals to) the neurons corresponding to regions of the image having an intensity level higher than a threshold value; or activating neurons over the course of multiple burst cycles, where higher intensities in the image cause the middleware module to activate neurons in corresponding areas in more burst cycles than neurons in regions of the layer corresponding to lower intensities in the image frame.

In some embodiments, the middleware 350 provides modules for providing outputs to input devices that are controllable based on one or more configuration settings, such as controlling the exposure settings (e.g., ISO, aperture, and shutter speed or frame rate) of a camera. Such a camera may therefore be considered as both an input device (inputting images or frames of images) and also as an output device (e.g., controlling the exposure settings and/or timing of capture). In some embodiments, control of the configuration settings of a camera is provided by defining particular cortical areas in the genome corresponding to the various configuration settings or, in this case, exposure settings (e.g., one cortical area for ISO, a second cortical area for aperture, and a third cortical area for frame rate). In this case, for each cortical area corresponding to each aspect of the configuration, a neuron or neuron cluster is allocated in the OPU 330 for each possible value. For example, for the cortical area representing the camera frame-rate, given that parameter accept values of 24, 30, 60, 120, allocate 4 individual neurons or four clusters of neurons to correspond to each of the four options. The genome may define cortical properties for each cortical area associated with device settings as such that each neuron or neuron cluster has axons connected to other neurons or neuron clusters with inhibitory post-synaptic behavior. This will cause the activation of one configuration value neuron or cluster to suppress the activation of other value options, thereby ensuring that only one configuration setting is chosen. Accordingly, the middleware module can monitor the firing activities of various clusters in the OPU 330 corresponding to the various settings to determine which settings are to be supplied to the device.

Some aspects of embodiments further relate to modifying the configuration settings of external devices based on cortical activities. As noted above, in some embodiments the middleware module is configured to monitor the neuronal activity of each hardware configuration setting region in the OPU 330 and only select the setting corresponding to the region with highest neuronal activity. In addition, the middleware module may read a current configuration value from the hardware device (e.g., the current exposure settings that are set in the camera), and then modify the setting on the hardware device (e.g., change the exposure settings) if the configuration setting output from the OPU 330 differs from the current setting, and otherwise doing nothing (e.g., not sending a command to the device).

In some circumstances, one of the values of the configuration settings may become dominant through exposure to various inputs and thereby become a default value for a particular configuration setting of a particular piece of hardware (e.g., an aperture of f/8 may become a default value of an aperture configuration setting based on the brightness of the environments that the connectome 300 is exposed to). Accordingly, to encourage exploration of different configuration setting values through genomic evolution, some embodiments of the present disclosure relate to flagging regions of the OPU that correspond to hardware configuration settings to encourage mutations in those regions, thereby decreasing the likelihood that particular hardware settings become default through the dominance of particular cortical regions.

As another example of a middleware module, audio processing may include breaking input audio into a plurality of time windows and applying a transform (e.g., a fast Fourier transform and/or a mel-frequency cepstrum (MFC)) to each window. In addition, different neurons in an audio input layer of the IPU 320 may correspond to different audio frequency ranges. During each time window, the power of the audio signal within each frequency band, as identified by the transform (e.g., based on the coefficients), is used to control the activation of the neuron or neurons corresponding to that frequency band.

In operation 450, the auto-connect agent 340 automatically detects robot I/O device types connected to the system such as camera or motor and have them associate with the matching IPU/OPU. Some aspects of the present disclosure relate to systems and methods for automatic identification of the input/output devices that are available to be connected to the neural network. In some embodiments, the host system (e.g., the auto-connect module or agent 340) continuously monitors for the availability of a supported device (e.g., physical attachment of a supported device, such as through a universal serial bus (USB) connector) and automatically connects the supported device with the neural network (e.g., the connectome 300). In some embodiments, when connecting to devices during start-up of the system and when a new input device or output device is connected to the system, the auto-connect module or agent 340 determines whether authorization is needed to use the device (e.g., whether an authentication process must be completed through a cryptographic handshake or other authentication mechanism), and obtains such authorization, as needed, to make use of the device. The auto-connect module or agent 340 may also refer to a library of supported input and output devices to validate whether the connected device is supported by the robot (e.g., whether appropriate drivers and information for configuring the middleware 350, IPU 320, OPU 330, and/or connectome 300 are stored in the auto-connect module 340 and/or the genome). If so, then corresponding configuration information is loaded for connecting sensor data from the device, such as loading drivers and middleware modules for the device, connecting any data streams output by the device to the IPU 320 (e.g., configuring cortical pathways in the IPU 320) and connecting any inputs to the device to the OPU 330. Likewise, the auto-connect module or agent 340 is also configured, in some embodiments, to automatically disconnect supported devices from the connectome 300 when those supported devices are no longer available (e.g., unplugged from the robot).

In operation 470, the IPU/OPU integration module 400 starts listening for data on IPU channels and spikes on neurons in the connectome 300 that are associated with OPU channels. In operation 490, in the IPU 320, the output of the IPU is connected to neurons of cortical areas of the connectome 300 that are designated by the genome 100 as associated with inputs (e.g., by identifying a list of neuron identifiers of neurons that will receive signals from the output of the IPU). Likewise, the OPU 330 is connected to receive inputs from neurons of cortical areas of the connectome that are designated by the genome 100 as being associated with outputs, such that the OPU 330 is configured to monitor spikes targeted for the OPU 330, which translates these spikes (in a device-specific manner) to instructions that can be processed by the middleware 350 and supplied to the output devices 380 via drivers 360.

While the IPUs 320 are generally modeled and described above in the context of interactions with real-world input devices 370 such as cameras, microphones, LIDAR, thermal sensors, gas sensors, infrared sensors, accelerometers, gyroscopes, proximity sensors, humidity sensors, light sensors, pressure sensors, touch sensors, pressure sensors, moisture sensors, and the like and the OPUs 330 are generally modeled and described above in the context of interactions with real-world output devices 380 such as motors, speakers, actuators, switches, relays, light sources, sound sources, vibration sources, computer protocol outputs (e.g., interfaces for interacting with computer systems and for generating computer outputs such as displaying text or graphics, sending commands to local or internet-based application programming interfaces, and the like) and the like, embodiments of the present disclosure are not limited thereto. For example, the training and development of a connectome 300 in accordance with various embodiments of the present disclosure, as described in more detail below, may be performed within a simulated environment, where the environment outside of the connectome 300 is a computer simulation, such as where the IPUs 320 and OPUs 330 connected to virtual input devices 370 (e.g., a virtual camera, a virtual microphone, etc.) and the virtual output devices 380. In one example described in more detail below, an IPU 320 may be configured to receive input images of handwritten digits from the Modified National Institute of Standards and Technology (MNIST) database as well as corresponding labels of the correct character (e.g., encoded using Unicode Transformation Format 8 (UTF-8) or American Standard Code for Information Interchange (ASCII)), and the OPU 33 may be connected to a text output for outputting the character code of the recognized digit (e.g., as encoded using UTF-8 or ASCII).

Referring to FIG. 1A and FIG. 5B, the neuron processing module or neuron processing unit 500 operates the integrated connectome to propagate signals or activations between the neurons within the connectome 300 as well as from and to the IPU 320 and the OPU 330.

In a biological brain, the timely firing of individual neurons drives the transferring and processing of information across the brain. One significant challenge to simulating a biological brain relates to the parallel processing nature of the brain because every neuron can act independently of others. To address the latter, some aspects of embodiments of the present disclosure relate to use of a "burst engine."

The concept of burst engine is based on event-driven simulation models (see, e.g., M. Mattia and P. D. Giudice, "Efficient event-driven simulation of large networks of spiking neurons and dynamical synapses," *Neural Computation*, vol. 12, pp. 2305-2329, 2000.) Every burst instance is associated with a list or queue of neurons whose membrane potentials have passed their firing thresholds and are therefore ready to fire. This list may be referred to herein as the "fire candidate list" or FCL. The burst engine fires all neurons listed in the FCL and simultaneously updates the membrane potentials of the neurons, which have synaptic connectivity with those that are firing.

Synaptic information is queried from the connectome through dictionary lookups. If any of the destination neurons exceed their membrane potential or firing thresholds, then they will be added to the FCL and fired in the next round of the burst engine cycle. In some embodiments, at any point in time, the NPU 500 maintains two instances of the FCL, one for the current round of the burst engine cycle, and one from the previous round of the burst engine cycle. Comparing the content of these two lists enables the implementation of neuroplasticity, which is described in more detail in a later section. Managing neuron firing through bursts provides control over the highly parallel nature of spiking neurons, which play a crucial role in learning and memorization.

In biological brains, the firing of a neuron may cause excitatory or inhibitory neurotransmitters to be released which increase or decrease the potential at the synapse. Accordingly, in some embodiments of the present disclosure, the firing of a neuron may have two different general forms of impact on the neuron receiving the signal. One form of impact is based on the inhibitory synapse type, where upon firing, the firing neuron has a negative impact on the action potential (e.g., reduces the action potential) of the downstream neuron; and the second form keeps track of the number of consecutive firings of a neuron within a window of bursts, and upon exceeding the threshold, a snooze flag is activated, thus preventing neurons from firing for a pre-defined number of bursts as defined in the genome. In experiments, this inhibitory behavior generally appears to prevent or reduce the occurrence of neuron clusters entering an infinite loop of firing. The inhibitory function acts as a damper, thereby regulating excessive feedback and stabilizing the communication.

The refractory period in the biological brain is a duration post-neuron firing, whereby a biological neuron is unable to fire again until the period is over. In some embodiments of the present disclosure, after a neuron fires, the NPU 500 prevents the neuron from firing for a predefined number of bursts. The refractory burst count is defined for a given neuron as part of the neuron properties in the genome 100 for a given cortical layer/sublayer, and its value can evolve over generations, as discussed in more detail below.

Figure 6A:
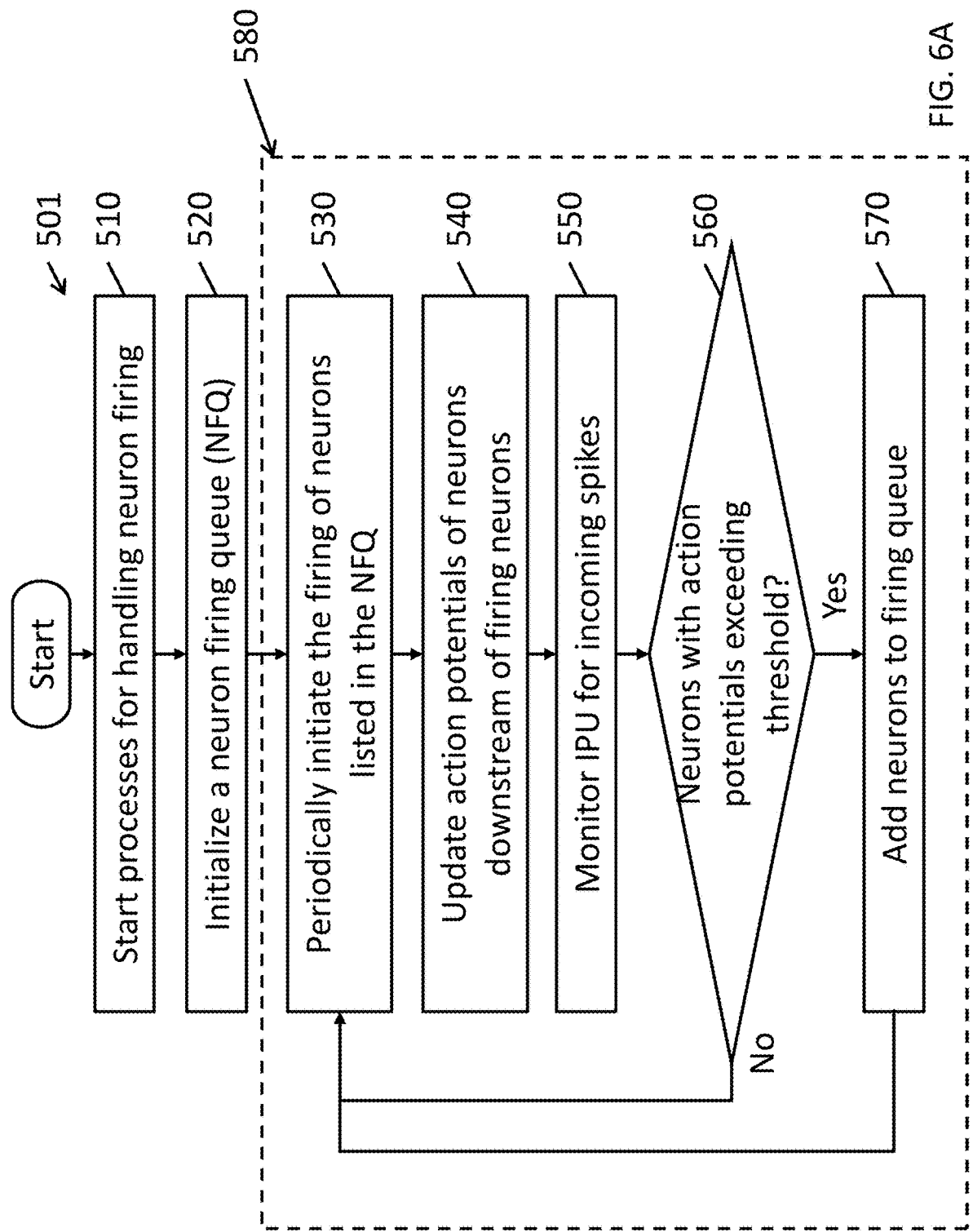
FIG. 6A is a flowchart of a method for operating a connectome by a neuron processing unit based on a spiking neural network according to one embodiment of the present disclosure.

FIG. 6A is a flowchart of a method 501 for operating a connectome by a neuron processing unit based on a spiking neural network according to one embodiment of the present disclosure. The operations described in FIG. 6A correspond to example embodiment of an implementation of a portion of operation 16 as shown in FIG. 1B.

In operation 510, the NPU 500 starts a set of event-driven processes responsible for handling neuron firing across the artificial brain.

In operation 520, the NPU 500 forms a "neuron firing queue" to house the list of neuron identifiers that are ready to fire.

In operation 530, the NPU 500 starts a process that continuously periodically (in a predetermined period) initiates the firing of all the neurons listed in the neuron fire queue from operation 520.

In operation 540, for every fired neuron, the NPU 500 updates the action potential associated with the neurons that the firing neuron's axon has connections with (downstream neurons).

In operation 550, the NPU 500 monitors the IPU 320 for any incoming spikes from the IPU 320 into the connectome 300.

In operation 560, the NPU 500 assesses if any downstream neuron within the connectome 300 has exceeded its firing threshold. If not, then the process returns to operation 530. If neurons have been activated signals received from other neurons or the IPU 320, then those neurons that were activated are added to the neuron fire queue in operation 570 and the process returns to operation 530.

Operations 530, 540, 550, 560, and 570 may be collectively referred to herein as a burst engine cycle 580, where a round of the cycle (e.g., an n-th round) begins with operation 530 that given round ends upon return to operation 530 for the start of the next round (e.g., an n+1-th round).

Some aspects of embodiments of the present disclosure further relate to modifying the connectome 300 based on the signals transmitted between neurons. Hebb's hypothesis (see, e.g., M. Bear, B. Connors, and M. Paradiso, Neuroscience: Exploring the brain, 4th ed. Wolters Kluwer, 2016) famously states that "Neurons that fire together, wire together." Some aspects of embodiments of the present disclosure relate to a variant implementation of spike-timing-dependent plasticity (STDP). In traditional STDP models (see, e.g., N. K. Kasabov, Time-Space, Spiking Neural Networks and Brain-Inspired Artificial Intelligence. Springer, 2019), there is a continuous relationship between synaptic weight and time-delta between the arrival of the pre-synaptic spike and the post-synaptic spike, that is, the longer the time-delta, the lower the synaptic weight of the STDP.

In some embodiments of the present disclosure, the sequence of bursts produced by the burst engine is used to keep the window of influence down to a single burst sequence. FIG. 6B is a graph depicting a function for synaptic weights in a variant of spike time dependent plasticity according to one embodiment of the present disclosure, where the mathematical formula defining the synaptic weight function shown FIG. 6B is:

$$SynapticWeight = \begin{cases} C & \text{if } \Delta B = +1 \\ -C & \text{if } \Delta B = -1 \\ 0 & \text{if } |\Delta B| > 1 \end{cases}$$

where C is the potentiation constant defined as a gene for each cortical layer, and ΔB is the difference between the burst sequence identifier associated with the post-synaptic firing neuron $B_{post}$ and the pre-synaptic firing neuron $B_{pre}$. That is, $\Delta B = B_{post} - B_{pre}$.

Assuming an upstream neuron A has its axon connected to downstream neuron B, in a comparative approach to STDP, when A fires briefly before B, this leads to long-term potentiation (LTP), and when A fires briefly after B, this leads to long-term depotentiation or long-term depression (LTD) on the synapse between A and B. In contrast, in a variation on STPD according to some embodiments of the present disclosure, when A fires in burst n (e.g., an n-th round of the burst engine cycle) and B fires in burst n+1, this leads to LTP, and when A fires in burst n and B fires in burst n−1, then LTD occurs. In other words, when a post-synaptic neuron fires in burst n−1 and a pre-synaptic neuron fires in burst n, there will be a penalty on the strength of the connection between the two neurons. If the difference in time is more than one burst, then there is no impact on the strength of the connection.

Accordingly, by applying STDP, the NPU 500 updates the strength of the connections between the neurons of the connectome 300, such as modifying the parameters within the data structure representing the weights of those connections. Accordingly, future signals between the neurons (e.g., from neuron A to neuron B) will be generated and transmitted in accordance with the updated weight.

As the connectome 300 operates, neuroplasticity causes the synaptic weights of connections among neurons to increase or decrease. In some cases, the process of updating the synaptic weights based on STDP causes the synaptic weight of a connection between two neurons may reduce that weight to a very small number or zero. In some embodiments, the NPU 500 eliminates such synapses or connections having very small or zero synaptic weight (e.g., a synaptic weight below a threshold value). This corresponds to the synaptic pruning phenomenon in the biological brain.

Generally, a neuron model is a mathematical and logical description defining the firing behavior of a neuron. Some embodiments of the present disclosure relate to the use of a neuron model based on the leaky integrate-and-fire model (see, e.g., A. D. Rast, F. Galluppi, X. Jin, and S. Furber, "The leaky integrate-and-fire neuron: A platform for synaptic model exploration on the spinnaker chip," in *Proceedings of the IEEE International Joint Conference on Neural Networks (IJCNN)*, Barcelona, Spain, July 2010, pp. 1-8). In particular, in embodiments of the present disclosure using a burst spiking model, a neuron model may be defined in accordance with:

$$P = \sum_{i=1}^{n} I_i - \frac{L_b}{L_c}$$

where P is the membrane potential for the neuron, $I_i$ is the post-synaptic current of the ith upstream neighbor, $L_b$ is a measure of time elapsed since the last neuron membrane potential calculation (e.g., in units of a number of burst cycles, which may be referred to herein as a number of bursts, where each burst or burst cycle corresponds to one round of firing all of the neurons listed in the FCL), and $L_c$ is the leak constant. Under this model according to embodiments of the present disclosure, the neuron fires in accordance with a trigger condition:

$$(P > F_t) \wedge (F_b > R_b) \wedge (C > S)$$

where P is the membrane potential, $F_t$ is the firing threshold, $F_b$ is the number of bursts since the last neuron firing, $R_b$ is the neuron's refractory period in the form of burst count, C is the pointer identifying the current burst counter position, and S is the pointer identifying the burst counter position by which the neuron was flagged in order to be snoozed.

Some aspects of embodiments of the present disclosure relate to storing information by the neuron processing unit 500 such that the connectome 300 self-learns in response to input supplied from the outside through the IPU 320. Both memory and learning are closely interrelated and together play a crucial role in cognition and intelligence.

Some aspects of embodiments of the present disclosure relate to implementing memory in an artificial brain in a technique inspired by the concept of "cell assembly" proposed by Donald Hebb (see, e.g., D. O. Hebb, *The organization of behavior: A neuropsychological theory*. Psychology Press, 2005). In "cell assembly," a group of nearly concurrently or simultaneously activated neurons represent an object (e.g., a semantic object) in response to an external stimulus, where external stimuli corresponding to different objects activate different groups of neurons, and different external stimuli corresponding to the same objects (or types of objects) activate the same or similar groups of neurons.

Figure 6C:
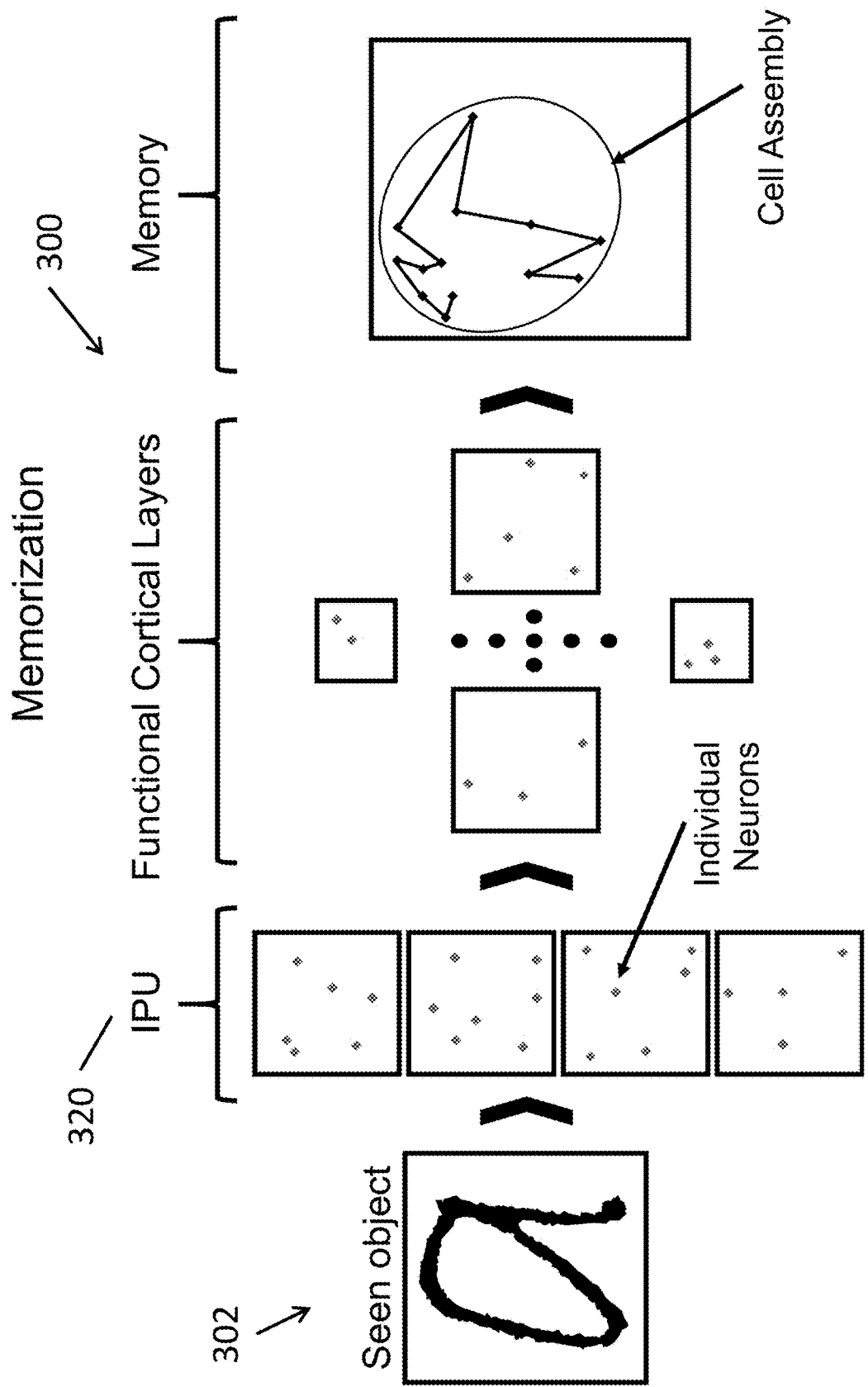
FIG. 6C is a conceptual view of how memories are formed within a connectome based on input stimuli received through an IPU according to one embodiment of the present disclosure.

When an input processing unit 320 is exposed to an external stimulus received from an input device 370, the external stimulus triggers a set of chain reactions. Raw information from the input device is broken down by the IPU 320 using functions that are sensitive to the fundamental physical properties of the stimuli, as discussed above. For example, a sound as received from a microphone may be broken down into frequency and magnitude modulation bands, and an image may be broken down into contrast and color variation before they are fed back into their designated functional pathways, as shown in FIG. 5A. Functional cortical pathways are a collection of interrelated cortical layers with different neuronal properties working together to process the information further. At the end of the cortical pathway, a distinct group of neurons represents the external stimulus as a unique signature that is projected to a memory region (or cortical region corresponding to memory) within the connectome 300. As the memory neuron ensemble (neurons within the memory region) becomes activated in close time proximity (e.g., at about the same time, in accordance with the variation of STDP described above, e.g., within one round of the burst cycle, e.g., ΔB=+1), long-term potentiation (LTP) occurs among them in accordance with the variation of STDP described above, thus leading to strengthened synaptic connectivity among neurons tied to the stimulus. FIG. 6C is a conceptual view of how memories are formed within a connectome based on input stimuli 302 (shown in the example of FIG. 6C as an image of a lowercase "a" in the "Bradley Hand" typeface by the International Typeface Corporation) received through an IPU 320 according to one embodiment of the present disclosure. This neuron ensemble may be referred to as a "cell assembly," as shown in FIG. 6C. Given that the activation of memory neurons by upstream cortical layers is an asynchronous process, the formation of the cell assembly is gradual and along the way, leads to the increase in synaptic connectivity between neurons, but not all to the same extent. In general, neurons participating in a cell assembly may not be fully connected.

FIG. 6D is a conceptual view of how multiple memories are formed within a connectome and joined or merged according to one embodiment of the present disclosure to represent the same object. In the example shown in FIG. 6D, a first input stimulus 302 (depicted as an image of a lowercase "a" in the "Bradley Hand" typeface) is shown contemporaneously with a second input stimulus 304 (depicted as an image of a lowercase "a" in the "Apple Chancery" typeface) representations of these objects may activate similar, but different cell assemblies, where the dashed lines in FIG. 6D depict the locations at which the cell assemblies differ. The combination of these cell assemblies reflect a representation in memory of the same "Learned Object," in this case, a lowercase "a" character.

Declarative or explicit memory is a type of memory related to events or facts and can be consciously recalled. Some aspects of embodiments of the present disclosure relate to implementing long-term memory as a pool of loosely-connected neurons. When an input stimulus (e.g., an input image or an audio waveform) representing a particular object (e.g., a picture of the letter "a" or the sound of a person saying the long "a" sound) stimulates the IPU 320, some neurons in the memory pool become activated; when another similar object is exposed, another set of neurons becomes activated. When both objects are introduced to the IPU 320 within a short period of time, a large percentage of activated neurons will be common between the two events, due to event similarities. This is a situation where the enhancement of synaptic strength between neurons belonging to the cell assemblies associated with each object occurs. After multiple occurrences of seeing both objects substantially simultaneously or concurrently, the strengthened synaptic connection between neurons tie the objects together. Therefore, if the stimulus related to the first object occurs, then it would lead to activation of neurons related to the co-occurring object as well, as shown in FIG. 6D, where different neurons were activated by input images depicting the letter "a" in two different fonts, and a learned representation of both object includes the neurons that were activated in by the images of the two individual images.

Figure 6E:
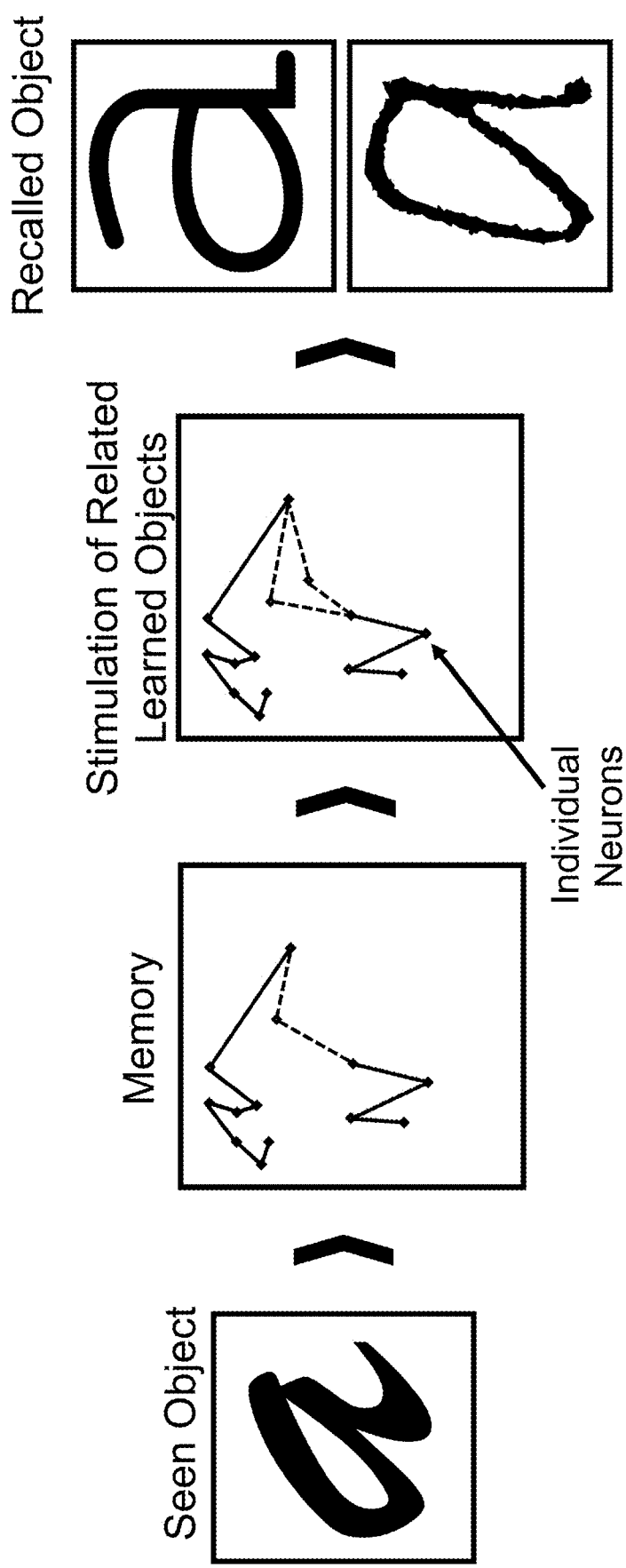
FIG. 6E is a conceptual view of recalling learned representations of objects based on an input stimulus according to one embodiment of the present disclosure.

In some embodiments of the present disclosure, retrieving memories stored in the strength of the connections between the neurons in the connectome 300 may be performed in accordance with a memory recall process. According to some embodiments of the present disclosure, the recall process involves the output processing unit 330. After the memorization process has taken place and different variations of an object have been stored in the long-term memory of the connectome 300 (e.g., in the form of cell assemblies of neurons that fire together in response to inputs corresponding to the object), the stimulation of a version of the trained object will lead to activation of the memory cells associated with all close variations of that same object. According to some embodiments, activations of the memory neurons associated with the object generate signals that are transmitted to neurons in an output region that are connected to an OPU 330, which ultimately leads to a physical manifestation in the outside world (e.g., outside of the connectome 300). FIG. 6E is a conceptual view of recalling learned representations of objects based on an input stimulus according to one embodiment of the present disclosure. As shown in the example of FIG. 6E, seeing the character "a" in one font (in the example of FIG. 6, the "Brush Script" typeface by Monotype Typography Limited) can activate neurons related to previously seen versions of "a" in other fonts (continuing the example, in the "Apple Chancery" and "Bradley Hand" typefaces), which in turn triggers the OPU 330 associated with characters encoded in an encoding format (such as Unicode Transformation Format 8 (UTF-8) or American Standard Code for Information Interchange (ASCII)) output to tell the operating system that the letter "a" was seen.

Associative learning is responsible for the creation of event associations in biological brains, such as that demonstrated by Ivan Pavlov in forming event associations in the mind of a dog from the ringing of a bell and to a salivation response. Some aspects of embodiments of the present disclosure relate to associative learning in a connectome 300. When an IPU 320 processes a stimulus, say IPU A, this generates neuronal activities in its corresponding cortical pathway within the connectome 300, ultimately activating a group of neurons in the memory region of the connectome associated with IPU A; at approximately the same time, IPU B may process a second stimulus, which leads to another set of neuronal activities in a memory region of the connectome 300 connected to IPU B. In accordance with Hebb's hypothesis as discussed above, STPD may be used to wire together (e.g., strengthen the connection) between the neurons across different memory regions that are firing together, thereby forming associations between different stimuli from the outside environment.

Some aspects of embodiments of the present disclosure relate to systems and methods for performing self-learning on a connectome 300. According to some embodiments of the present disclosure, the NPU 500 captures self-assessment results of the connectome (e.g., storing the self-assessment results in a database or other data store) and using the self-assessment results to perform fitness evaluations on the performance of the connectome 300.

For example, to be able to learn to recognize images of the number "7," a biological brain may need to be exposed to variations of this number over and over in a short period so that association can occur. Similarly, embodiments of the presented disclosure may be configured to learn to recognize images of the number "7" after being exposed to different variations of the character's image. As one example, images of handwritten numerals from the Modified National Institute of Standards and Technology (MNIST) database of handwritten numbers may be repeatedly fed to the vision IPU at approximately the same time as when the correct UTF-8 version of it is fed to an IPU configured to receive encodings of characters in UTF-8. This task is repeated over and over with multiple variations of the same character's image. Information flows in the form of neuronal activities through vision and UTF-8 cortical pathways simultaneously (e.g., within one round of the burst cycle), and when reaching the corresponding memory modules, distinct cell assemblies begin to form. After the learning process for a particular character is complete, the self-learning algorithm may move on to the next character in the queue (e.g., images of the number "8"). This method was inspired by how children learn the alphabet through simultaneous printing and observation that is repeated many times.

In view of the above, some aspects of embodiments of the present disclosure relate to applying techniques such as supervised learning and reinforcement learning within the framework of supplying inputs to a connectome 300 via one or more IPUs 320 to train a connectome to perform various tasks.

The above example of teaching a connectome 300 to classify handwritten digits from the MNIST database into classes corresponding to different UTF-8 characters representing the digits 0 through 9 is a case of supervised learning. In one embodiment, the supervised learning procedure includes:

Reading from MNIST: Variations of labeled images of numbers from the MNIST database are read, and the image data along with label information are simultaneously and respectively fed to the vision and UTF input processing units.

Exposure duration: A variable is defined to be able to adjust the amount of exposure each input would have to the system and is measured in units of burst count. The smallest exposure duration is a single round of the burst cycle (which may be referred to herein as a single "burst"). The exposure equates to feeding the raw data associated with the stimulus to the input processing unit repeatedly for the exposure duration.

In some embodiments, there is a no-activity period between each exposure phase (e.g., between different digits) to assist with the decay of neuronal activities and noise from the previous exposure within the cortical layers before a new set of activities occurs.

As another example, in some embodiments, reinforcement learning is performed using analogues of pain and inhibitory neurotransmitters. Pain receptors stimulate pain neurons, which in turn apply long-term depression (LTD) against the synapses involved in activation of an incorrect response. Similarly, the synapses involved with the correctly recognized object are rewarded by applying long-term potentiation (LTP).

To test the performance of the trained connectome 300, after an image is exposed and the neuronal stimulations have passed through the cortical layers, a listener monitors the activities of an OPU 330 (e.g., the UTF-8 OPU in the case of recognizing handwritten characters) and records the results. There will be three scenarios: first, the stimulation of the output neuron could correspond to the correct image label; second, it could correspond to a wrong label; and finally, there could be no stimulation. These information are captured in a data structure by a self-assessment module of the NPU 500 and used for the fitness evaluations when the testing period is over. In some embodiments, these self-assessment results are saved in the genome repository 110 alongside the genome 100.

Figure 7:
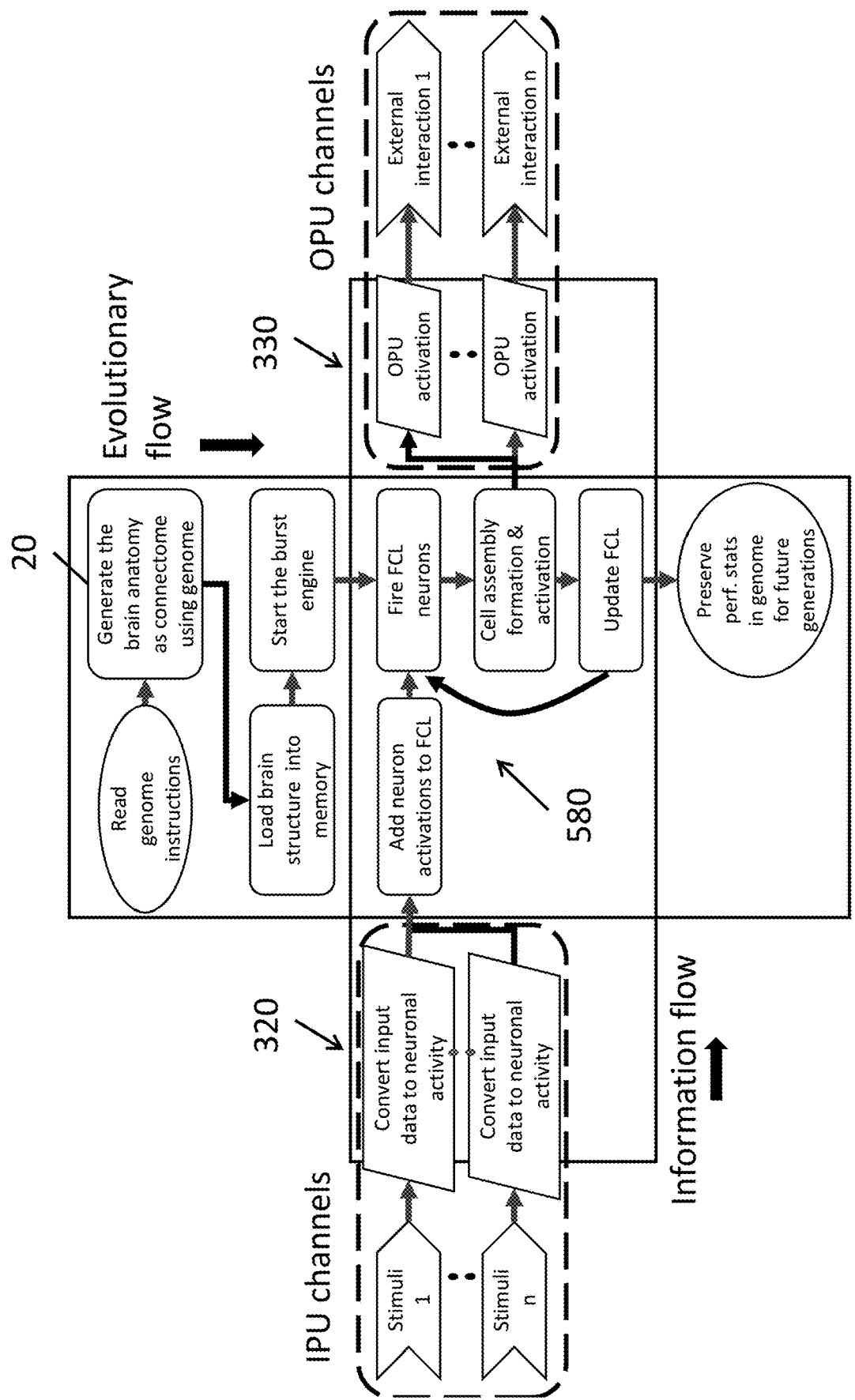
FIG. 7 is a schematic diagram summarizing the evolutionary flow and information flow of a connectome according to some embodiments of the present disclosure.

FIG. 7 is a schematic diagram summarizing the evolutionary flow and information flow of a connectome according to some embodiments of the present disclosure. Reference numbers corresponding to portions of the system described in more detail earlier are reproduced in FIG. 7, without limiting the overview shown in FIG. 7 to the particular embodiments described with respect to those reference numbers.

As shown in FIG. 7, in some embodiments, the evolutionary flow begins with reading genome instructions from a genome 100 and generating a connectome 300 using the genome 100 in accordance with a neuroembryogenesis process 20 such as that described above. The generated connectome 300 may then be loaded into the memory of a neuron processing unit 500, which may then start a burst engine configured to propagate signals through the connectome 300 and to update weights within the connectome 300 during operation.

Turning to the information flow portion of FIG. 7, information from the outside world may be presented in the form of multiple stimuli, depicted in FIG. 7 and Stimuli 1 through Stimuli n. These may each be converted from their raw input formats (e.g., bitmap images, audio waveforms, and the like) into neuronal activity by corresponding IPUs 320. These neuronal signals are then supplied to the connectome 300 by adding neuron activations to the firing candidate list (FCL) maintained by the burst engine of the NPU 500. Accordingly, neuronal activity generated by the IPUs 320 become part of the neuronal signals being processed by the burst engine.

As discussed above, the burst engine may operate a burst cycle 580 where, during each round of the cycle, the burst engine fires the neurons that appear on the FCL, thereby propagating signals from those neurons to target neurons that are connected to the FCL neurons. The NPU 500 then updates the weights of the connections between the neurons in accordance with the STDP process as discussed above, and updates the values at the neurons that receive the signals transmitted by the firing neurons. Some of the neurons that fired may transmit signals to one or more of the OPUs 330. In such a case, the OPUs 300 generate outputs to control their respective devices, such as motors, actuators, speakers, and the like, to generate external interactions.

The burst engine of the NPU 500 then identifies neurons within the connectome 300 that have satisfied the firing criteria (e.g., where the membrane potentials or accumulated inputs from neurons that have fired exceed a threshold value) and adds these neurons to the FCL for the next round of the burst engine.

Performance statistics of the connectome 300, such as the self-assessment results, may also be stored and used for generating future generations of genomes based on the genome 100 used to generate the current connectome 300, as will be discussed in more detail below.

Some aspects of embodiments of the present disclosure relate to updating the genome 100 in accordance with feedback from the activity of the connectome 300 during operation, such as the performance statistics and firing histories of the neurons of the connectome. Referring to FIG. 1A, the feedback may be collectively referred to as an activity log 600, and the activity log 600 may be supplied, together with the genome 100, to an evolutionary module or a genome update module 700 to generate one or more updated genomes 800.

Multiple factors influence the evolution of a system, including imposed environmental constraints, the effects of external and internal environmental changes on the system dynamics, and survival needs. A system can evolve both while it is active and after it is deactivated.

An artificial brain in accordance with embodiments of the present disclosure may evolve along multiple aspects. One aspect occurs during the artificial neuroembryogenesis process 20 performed by the neuroembryogenesis unit 200 while the artificial brain or connectome 300 is grown from a genome 100 until it reaches maturity. Another aspect occurs in the form of neuroplasticity while the artificial brain is exposed to an external stimulus and undergoes the learning process. In this case, new connections are made, and existing connections are strengthened, deteriorated, or eliminated in accordance with the STDP process of updating the weights of connections as part of the burst cycle described above. One additional evolutionary aspect of embodiments of the present disclosure relates to evolving the genome over generations, as explained below.

Some aspects of embodiments of the present disclosure relate to improving an instance of an artificial brain, as generated from a genome 100, by collecting statistical data associated with the overall performance of the artificial brain when performing cognitive tasks during its lifetime and using the statistical data to generate new genomes. The collected statistical data may be used to modify the structure of the cortical areas within the connectome 300, such as generating additional neurons, pruning connections, and creating new connections, beyond what would be performed by STDP processes as described above in a form of dynamic or continuous updating of a running connectome. The collected statistical data 190 may also be stored in a genome repository 110 alongside the genome 100 responsible for the creation of that artificial brain, as shown in FIG. 2 in a form of offline or generational updating of a genome for generating a connectome, e.g., by the genome update module 700.

As discussed above, in some embodiments, the NPU 500 is configured to automatically collect statistics while the connectome 300 is interacting with and processing external stimuli received through the IPUs 320, and is configured to automatically save the collected statistics in the form of metadata along with the genome, in the form of self-assessment results when performing testing in supervised learning as well as in the form of monitoring the number of times any given neuron has fired over the course of a given number of rounds of burst cycles.

Figure 8:
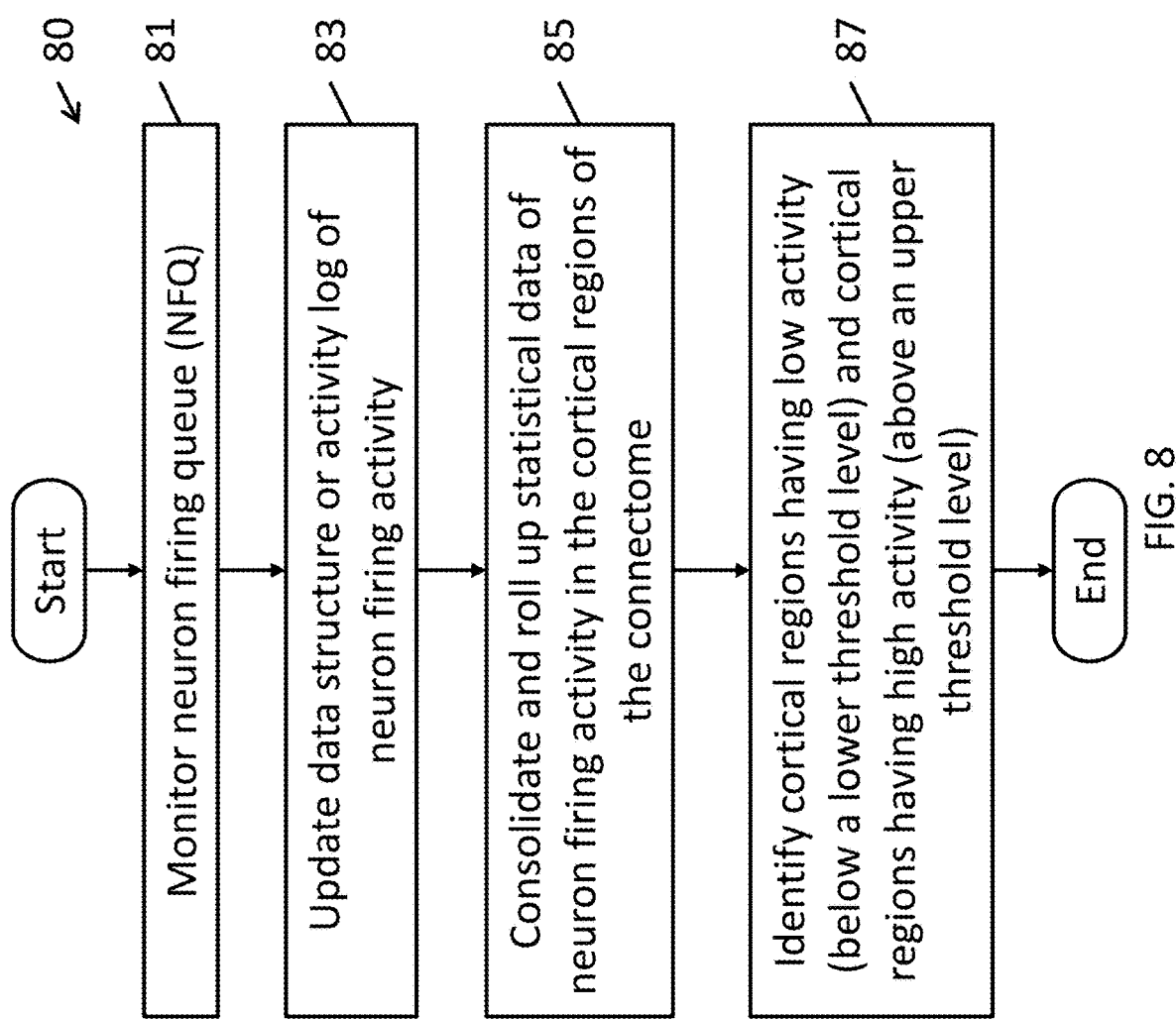
FIG. 8 is a flowchart of a method for monitoring and measuring the level of activity across a connectome according to one embodiment of the present disclosure.

FIG. 8 is a flowchart of a method 80 for monitoring and measuring the level of activity across a connectome according to one embodiment of the present disclosure. In operation 81, the NPU 500 starts a process for monitoring the neuron fire queue or firing candidate list (FCL). Upon firing of each neuron, in operation 83 the NPU 500 updates a database or data structure with the locality information associated with the firing neuron such as associated cortical area, local coordinates associated with the position of the neuron within the cortical area, and a high level block level association that outlines the position of the neuron within a cortical area with higher level of granularity. In operation 85, the NPU 500 consolidates and rolls up statistical data associated with different cortical regions of the connectome 300. This operation may be performed at a time when the system is idle, such as when the IPUs 320 are not generating significant spiking signals, and/or when the current number of spiking signals passing through the connectome 300 is relatively low. In operation 87, the NPU 500 generates a list outlining cortical regions and sub-regions with minimal activity as well as excess amount of activity, and this list of statistical information is included in the activity log 600 representing the activity of the connectome 300 during operation.

Figure 9A:
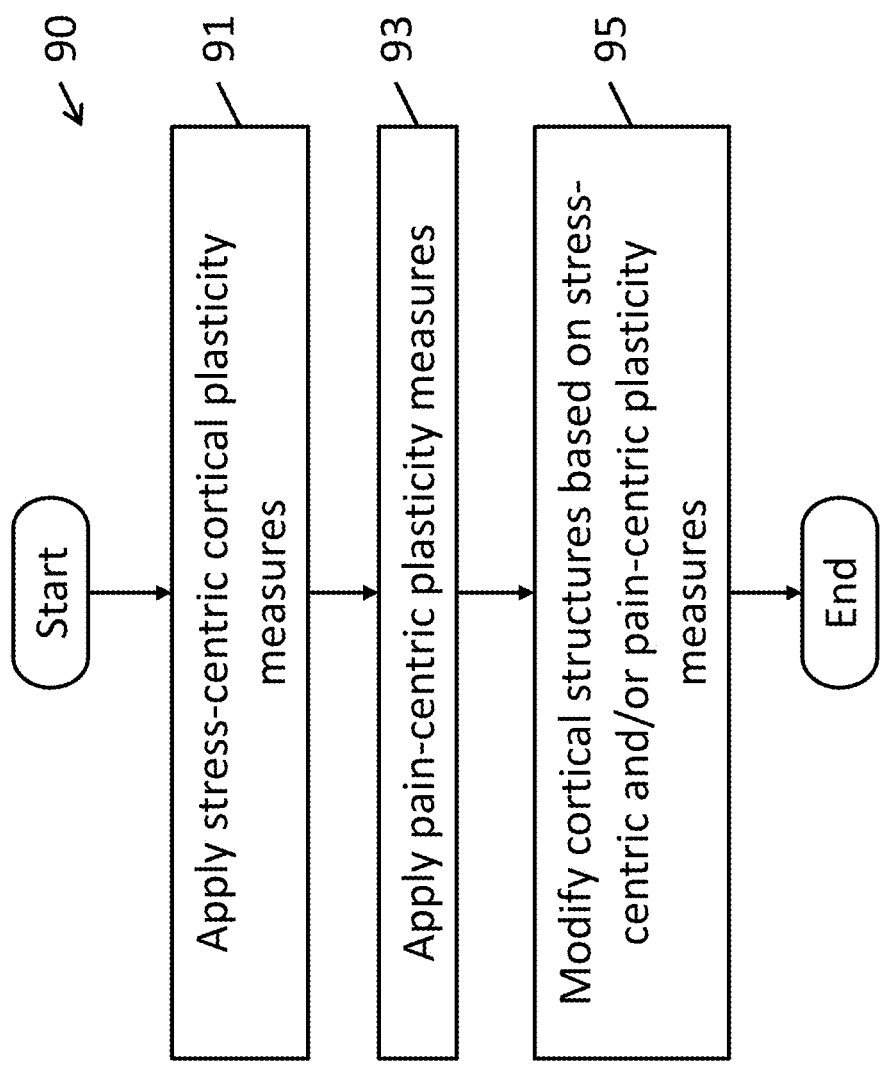
FIG. 9A is a flowchart of a method for dynamically updating or evolving the structure of an artificial brain or artificial neural network according to one embodiment of the present disclosure.

FIG. 9A is a flowchart of a method for dynamically updating or evolving the structure of an artificial brain or artificial neural network according to one embodiment of the present disclosure.

Figure 9B:
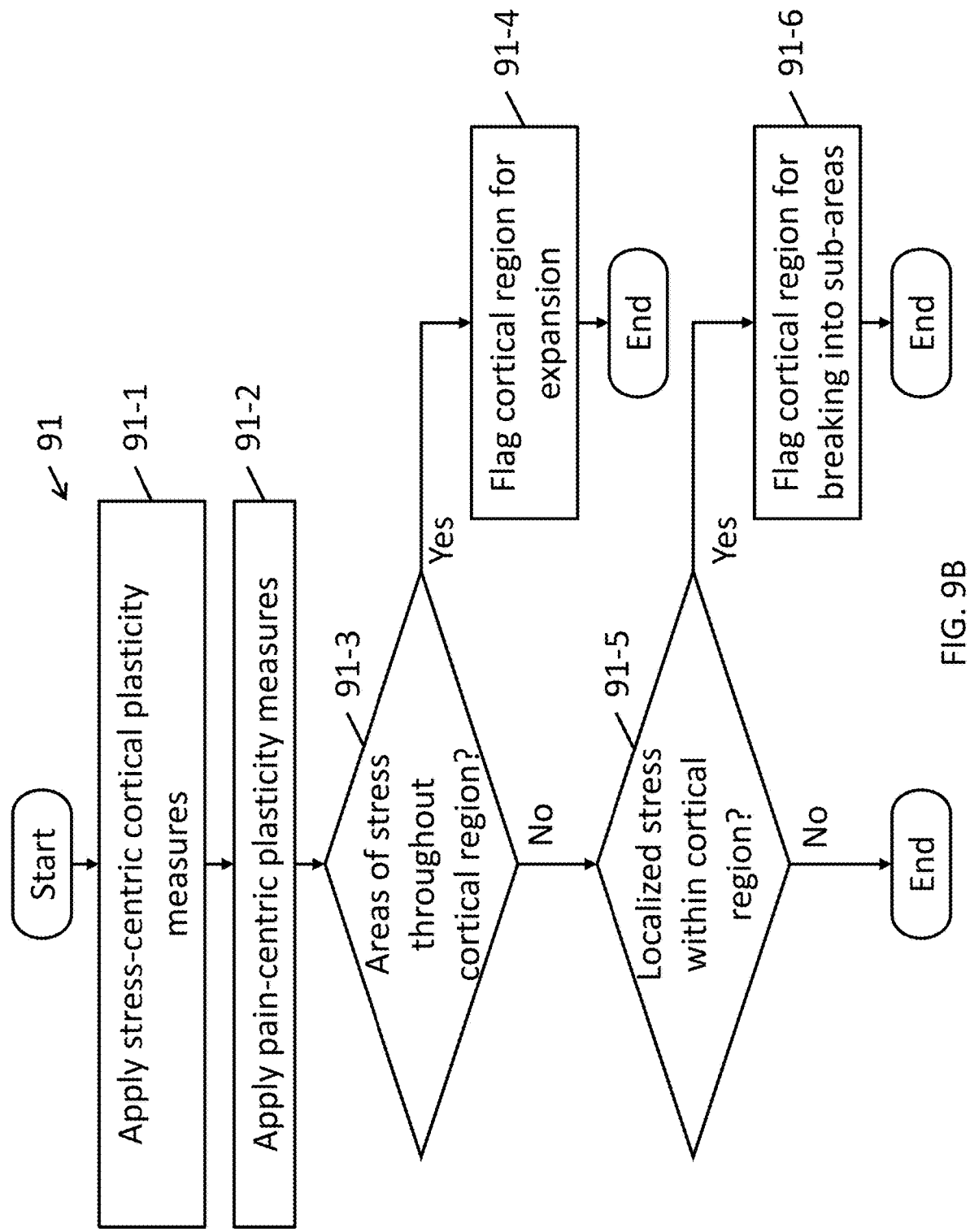
FIG. 9B is a flowchart of a method for dynamically updating or evolving the structure of an artificial brain or artificial neural network in accordance with stress-centric cortical plasticity measures according to one embodiment of the present disclosure.

In operation 91, the NPU 500 computes stress-centric cortical plasticity measures and modifications to the cortical regions based on the list of cortical regions and sub-regions with minimal activity and excess activity generated in accordance with method 80. FIG. 9B is a flowchart of a method 91 for dynamically updating or evolving the structure of an artificial brain or artificial neural network in accordance with stress-centric cortical plasticity measures according to one embodiment of the present disclosure. In more detail, FIG. 9B depicts analysis of stress within one cortical region within the connectome 300. In some embodiments, the method of FIG. 9B is performed for each cortical region of the connectome 300 to generate stress measures and modifications for each cortical region.

In operation 91-1, the NPU 500 monitors cortical activity statistics measured in accordance with the method 80 of FIG. 8, and assess the stress level and scope (e.g., location of the stress) in operation 91-2. In operation 91-3, the NPU 500 determines whether there is major chronic stress in the entire cortical region of the connectome 300. In some embodiments, the NPU 500 determines that major chronic stress is present in a cortical region when neurons that fire at rates higher than a particular threshold are found throughout the geometric shape of the cortical region. This may indicate that there many excitatory connections among the neurons in this cortical region that leads to a repeated self-stimulation of neurons within that cortical region, thereby resulting in high activity of most or all of the neurons. Another potential reason for detecting high neuron firing rates is that the number of neurons in the cortical region is too small relation to the amount of the information (e.g., the number of spiking signals) flowing into that cortical region (e.g., too many synapses or connections from other cortical regions into the neurons of the given cortical region). This sort of "chronic stress" may cause problems in the ability of that cortical region to capture the dynamic range of inputs, such as potentially saturating the ability of neurons in those regions to generate outputs when the input spiking signals are particularly high. Therefore, when detecting that a current cortical area is under chronic stress, in operation 91-4, the NPU 500 indicates that the current cortical area is to be expanded. For example, by expanding a cortical region and potentially increasing the number of neurons present there, the density of stimulation from other cortical regions may be reduced to more typical levels, thereby enabling the cortical region or area to respond to the range of input spiking signals without saturating its output dynamic range.

If there is not major chronic stress across the entire cortical region, then in operation 91-5, the NPU 500 determines if there is localized stress in confined clusters within the cortical region. If so, then in operation 91-6 the NPU 500 promotes breaking the region into sub-areas with modified cortical properties. In some embodiments, the cortical properties of the sub-areas are modified from the properties of the previous cortical region based on a combination of synaptic pruning and neuron creation and neuroplasticity that would shape and strengthen new connections. In the case of cortical regions with synaptic activity below a threshold level, in some embodiments, the NPU 500 applies synaptic pruning (where in-active synapses are removed from connectome), and in some embodiments, the NPU 500 removes neurons from the connectome if they are inactive for an extended period of time (e.g., more than some particular number of burst cycles), and may also indicate that a particular cortical area may be reduced in size or have the density of neurons reduced. If not, then no modifications are made to the current cortical area.

Figure 9C:
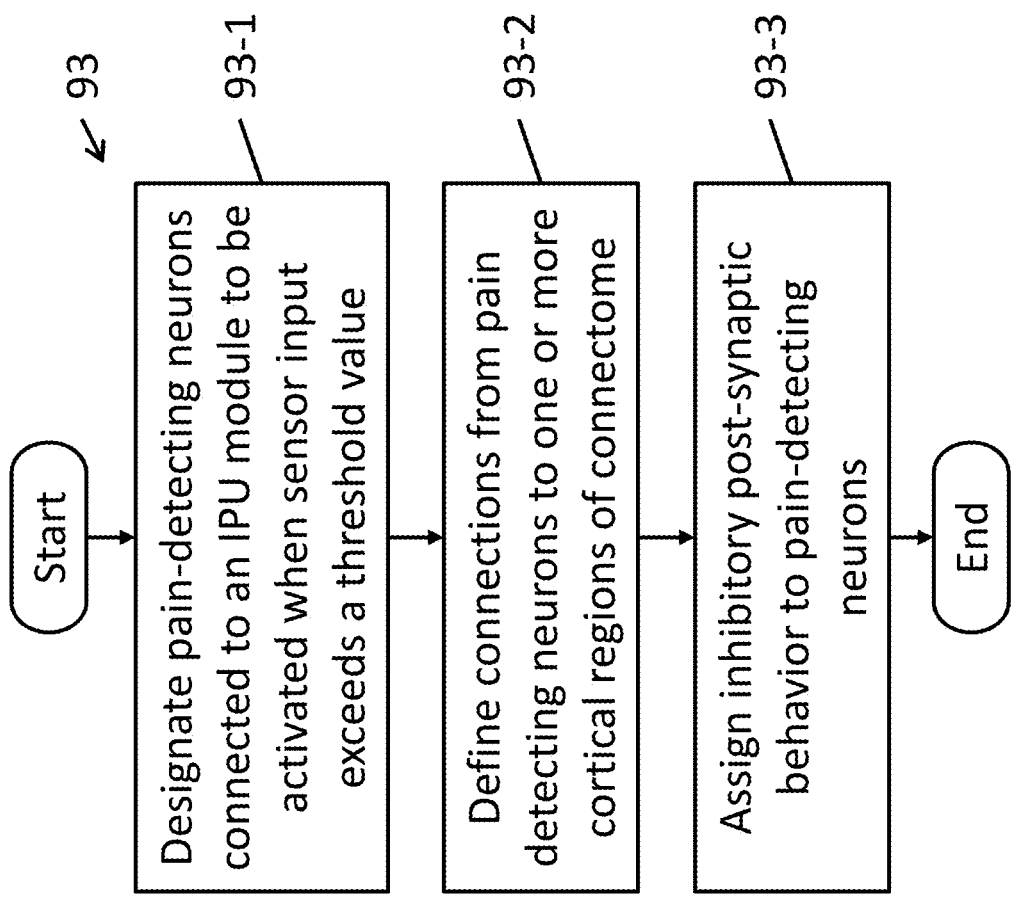
FIG. 9C is a flowchart of a method for dynamically updating or evolving the structure of an artificial brain or artificial neural network in accordance with pain-centric cortical plasticity measures according to one embodiment of the present disclosure.

Turning back to FIG. 9A, in operation 93, the NPU 500 computes pain-centric plasticity measures based on the information regarding the activity. FIG. 9C is a flowchart of a method 93 for dynamically updating or evolving the structure of an artificial brain or artificial neural network in accordance with pain-centric cortical plasticity measures according to one embodiment of the present disclosure. In operation 93-1 the NPU 500 designates a set of pain detecting neurons as part of each IPU module to be activated when particular sensors exceed or satisfy a predefined threshold. In operation 93-2, the NPU 500 defines axonal connections from pain detecting neurons to branch out to various cortical regions. In operation 93-3, the NPU 500 assigns inhibitory post-synaptic behavior to pain oriented neurons (e.g., connections from pain detecting neurons apply inhibitory post-synaptic signals to destination neurons).

Referring back to FIG. 9A, in operation 95, the NPU 500 modifies the cortical structures of the connectome 300 through, for example, neurogenesis, neuron pruning, synaptogenesis, synaptic pruning, and synaptic plasticity, based on the stress-centric cortical plasticity measures computed in operation 91 and the pain-centric plasticity measures computed in operation 93 to generate an updated connectome 300 for continued operation in later rounds of the burst cycle. For example, in some embodiments, the NPU 500 breaks up or expands cortical layers based on the measures computed in operation 91 based on stress-centric cortical plasticity. In addition, weights of connections may be updated in accordance with STDP-like procedures, as described above, based on the pain-centric plasticity measures, such that connections are strengthened (in accordance with LTP), weakened (in accordance with LTD), or pruned (when weakened below a threshold level).

Based on experimental observations, the dynamic development of the anatomy of a connectome 300 in accordance with processes such as those shown in FIG. 9A can be generalized into two stages: a first "maturity" stage or "maturity" period beginning when the new connectome 300 produced by the artificial neuroembryogenesis process 12 is first exposed to outside input, and a second "matured" (or developed) stage following the "maturity" stage. The first maturity stage is characterized in that the stress-centric cortical plasticity measures computed in operation 91 and the pain-centric plasticity measures computed in operation 93 will tend to have larger effects on the structure of the connectome 300, including breaking-up and expanding cortical areas. Generally, after being exposed to external inputs for some amount of time (e.g., some number of burst cycles), the structure of the connectome 300 typically stabilizes and remains generally static, thereby beginning the second "matured" or "developed" stage. During the second matured or developed stage, the strength of connections may still change based on applying STDP, thereby enabling the storage of information and recognition of new patterns (e.g., the formation of memories as described with respect to FIGS. 6A, 6B, 6C, and 6D), but generally does not result in major changes in the architecture of the connectome 300 (absent dramatic changes in the distribution of the input supplied to the connectome 300).

Accordingly, some aspects of embodiments of the present disclosure provide systems and methods for dynamically updating a connectome 300 during operation, based on stress-centric cortical plasticity and pain-centric plasticity measures.

Figure 10A:
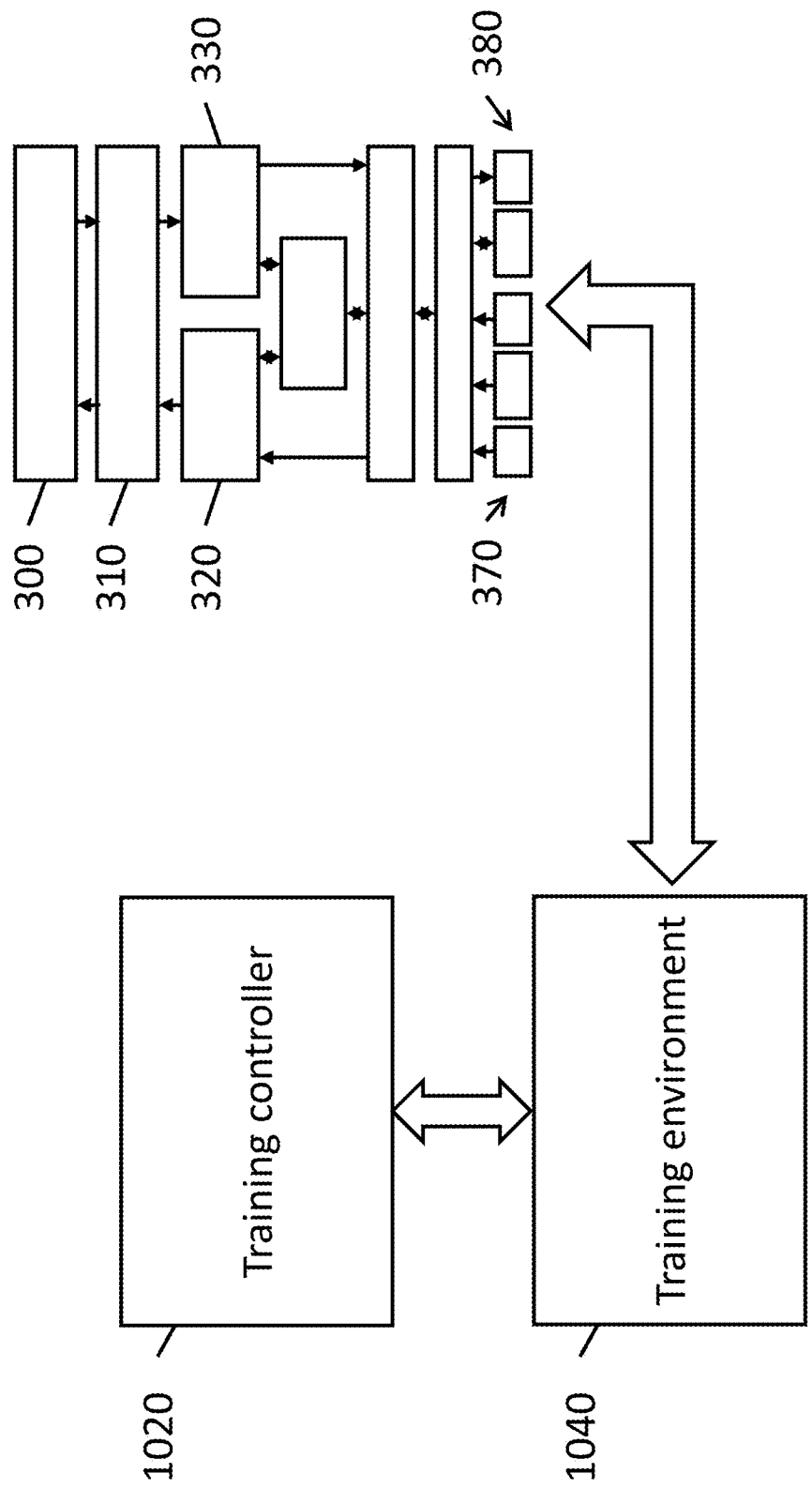
FIG. 10A is a block diagram of a training system for training an artificial brain or artificial neural network according to one embodiment of the present disclosure.

Some aspects of embodiments of the present disclosure relate in particular to training and developing an artificial brain (e.g., a connectome 300) for operating a robot such as a humanoid robot. FIG. 10A is a block diagram of a training system for training an artificial brain or artificial neural network according to one embodiment of the present disclosure. Referring to FIG. 10A, in some embodiments, a training controller 1020 controls a training environment 1040 to train a connectome 300. In particular, the training controller 1020 may control the training environment to provide stimulus to the connectome 300 through the input devices 370 and to also detect outputs generated by the output devices 380 controlled by the connectome 300.

As noted above, in some embodiments of the present disclosure, a simulated environment is used as the training environment 1040 during the training of a connectome 300. In some embodiments, such as for training a robot to operate in the real world, the simulated environment may be a three-dimensional virtual environment with a physics engine, such as a 3-D game engine, where such as where a virtual camera input device may capture still images of the 3-D virtual environment from its position within that 3-D virtual environment and where actuators and motors may represent the control of various parts of a virtual character (e.g., a humanoid character) within the virtual environment in accordance with physical behavior (e.g., Newtonian physics) as simulated by the physics engine. Performing training in a simulation rather than in the real-world can accelerate the training process and reduce the costs because physical training environments do not need to be manually constructed and/or reset between training runs and because simulated time can be controlled to be faster than real time, as constrained by the complexity of the simulation.

As such, training a connectome 300 accordance with embodiments of the present disclosure include, without limitation, embodiments where the training environment 1040 is a real world environment and embodiments where the training environment 1040 is a simulated environment, or combinations thereof (e.g., a physical room with physical objects, but where a virtual camera input is used to provide images of a simulated 3-D environment).

Figure 10B:
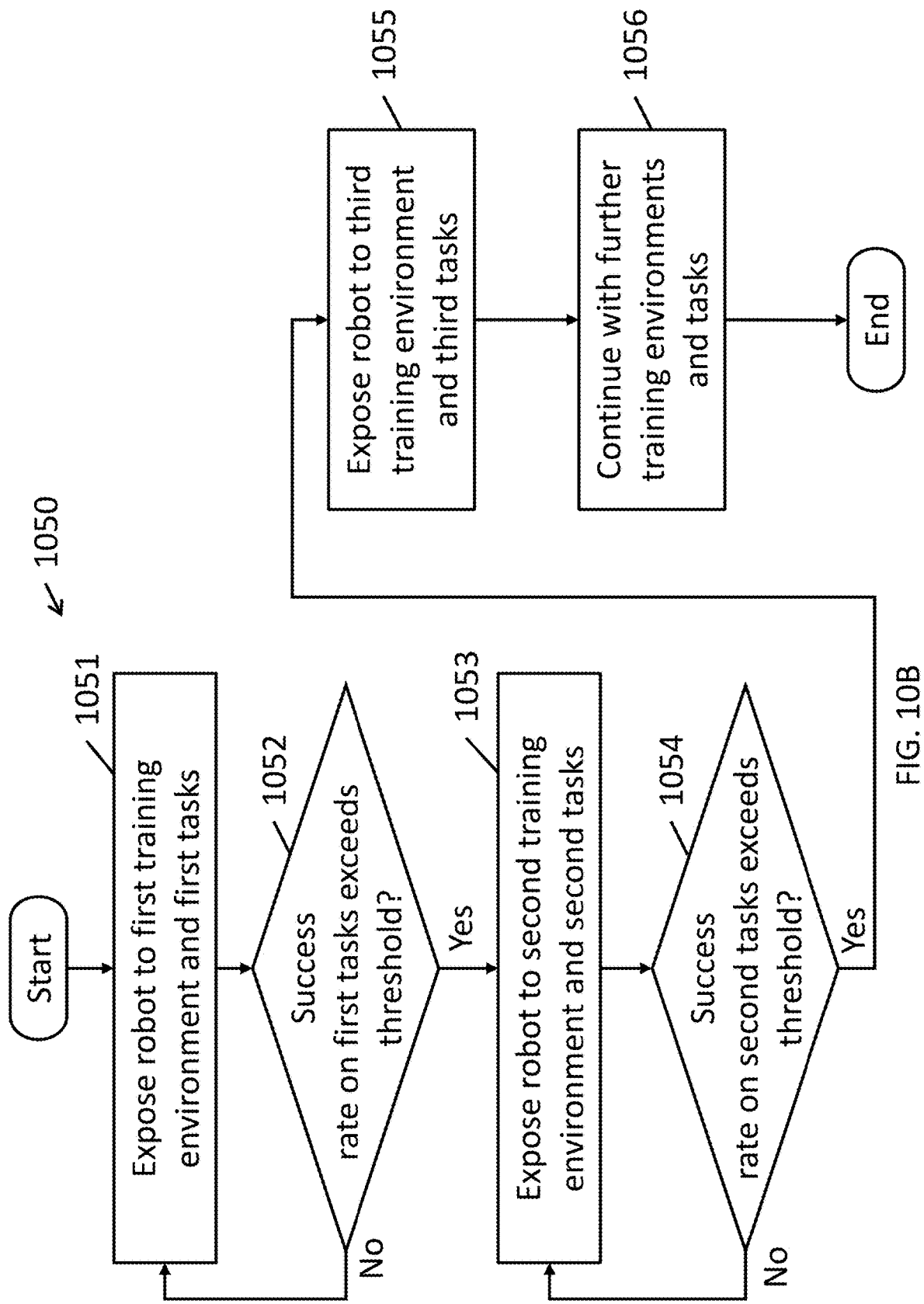
FIG. 10B is a flowchart of a method for updating an artificial brain or artificial neural network based on external interactions according to one embodiment of the present disclosure.

FIG. 10B is a flowchart of a method 1050 for updating an artificial brain or artificial neural network based on external interactions according to one embodiment of the present disclosure. The operations of FIG. 10B may be performed by the training controller 1020. In the case of a simulated environment, the training controller may be implemented as a software program that controls the operation of the neuron processing unit 500 and the simulated environment. In the case of training in the real-world, the training controller may be a software program configured to control a physical training environment, such as including actuators and sensors for controlling the locations and positions of objects in a training facility.

Referring to FIG. 10B, in operation 1051, the training controller 1020 controls the training environment 1040 to expose a robot (e.g., a humanoid robot) controlled by the connectome 300 to an environment that can assist with foundational learning such as: Vision (gaze, look around, try different blobs, enhance vision resolution); Hands and legs (move around, explore, correlate with vision) and evaluates the robot on the performance of tasks corresponding to this stage (e.g., detection of objects and mobility within the environment). During the process of being exposed to the environment, the NPU 500 continues to update the connections of the brain in accordance with STDP and the methods described above with respect to FIGS. 9A, 9B, and 9C.

In operation 1052, the training controller 1020 assess the success rate of the connectome 300 in completing tasks within the training environment 1040. If the success rate is above a threshold rate, then the training proceeds with operation 1053. If not, then the process returns to training in accordance with operation 1051.

In operation 1053, the training controller 1020 controls the training environment 1040 to expose the robot to an environment that can assist with next level learning such as: Vision (identify object boundaries); Hands and actuators (grasp objects, reach an object); legs and mobility (learn balance the body and move around the environment) and evaluates the robot on the performance of tasks corresponding to this stage (e.g., detection of object boundaries, manipulating objects in the environment, and stability in movement in the environment). During the process of being exposed to the environment, the NPU 500 continues to update the connections of the brain in accordance with STDP and the methods described above with respect to FIGS. 9A, 9B, and 9C.

In operation 1052, the training controller 1020 assess the success rate of the connectome 300 in completing tasks within the training environment 1040. If the success rate is above a threshold rate, then the training proceeds with operation 1055. If not, then the process returns to training in accordance with operation 1053.

In operation 1055, the training controller 1020 controls the training environment 1040 to expose the robot to an environment that can assist with next level learning such as: Vision (differentiate objects, faces, and the like); Hands and actuators (fine handling of objects); and Legs and mobility (walking and directed movement around the environment), and evaluates the robot on the performance of tasks corresponding to this stage. During the process of being exposed to the environment, the NPU 500 continues to update the connections of the brain in accordance with STDP and the methods described above with respect to FIGS. 9A, 9B, and 9C.

In some embodiments, the training process may continue with further and more advanced tasks and goals through various additional stages 1056.

As noted above, some aspects of embodiments of the present disclosure relate to a method for offline training through the updating of a genome based on an activity log 600 of neuronal firing during training (e.g., in a training environment 1040) and/or operation (e.g., in deployment in a real-world application).

Figure 11:
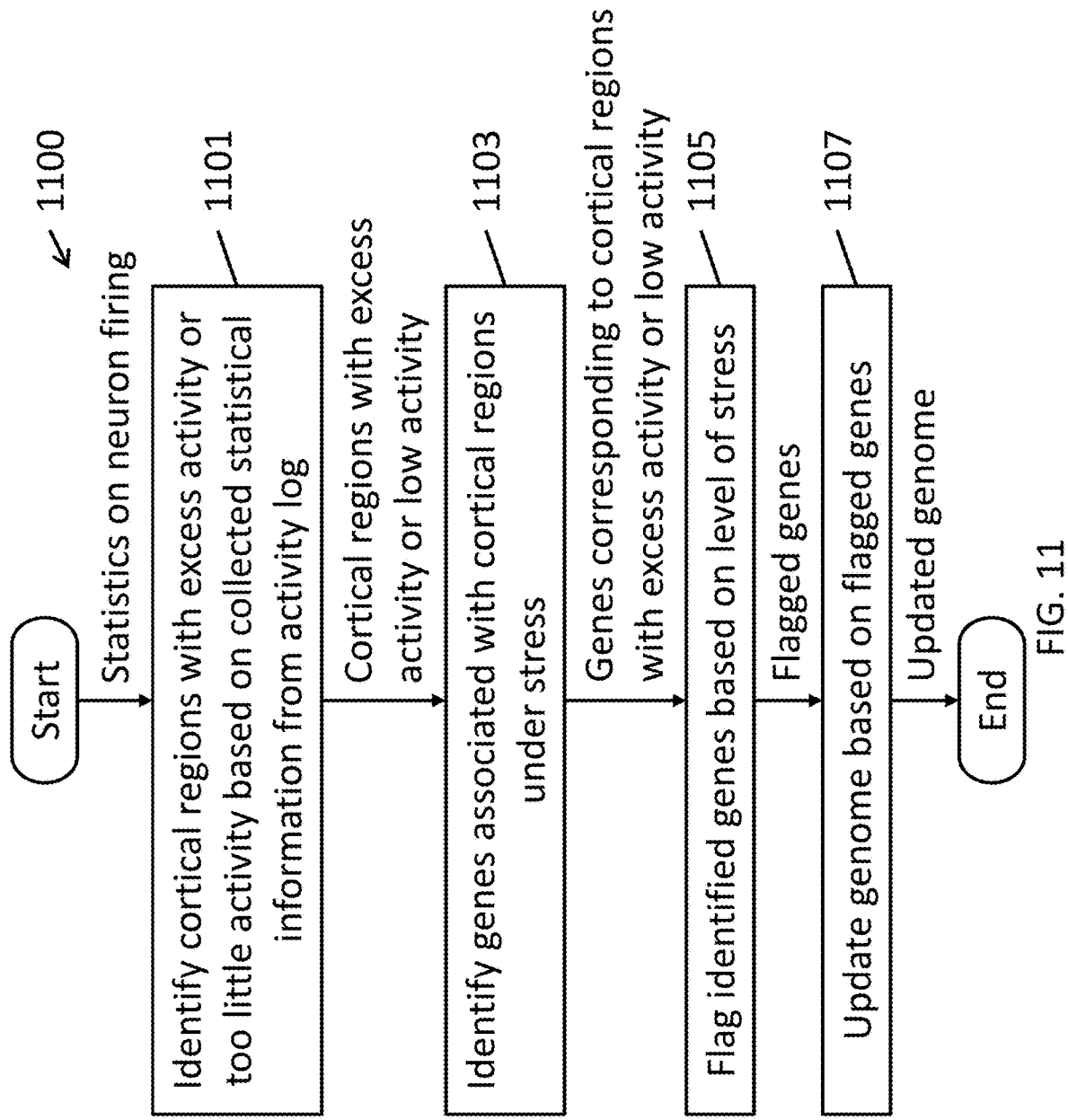
FIG. 11 is a flowchart of a method for identifying and flagging genes based on level of stress according to one embodiment of the present disclosure.

Some aspects of updating a genome based on activity log relate to identifying genes for modification based on stress. FIG. 11 is a flowchart of a method 1100 for identifying and flagging genes based on level of stress according to one embodiment of the present disclosure.

In operation 1101, the genome update module 700 compares statistical information related to neuronal and synaptic activities against a set of rules (e.g., a predefined set of rules) to identify cortical regions under stress due to having excess or too little activity (e.g. number of bursts or burst rate above an upper threshold or below a lower threshold).

In operation 1103, the genome update module 700 identifies genes associated with the cortical area under stress, such as the genes in the genome 100 within the cortical blueprint 122 that correspond to a particular cortical area 123 under stress.

In operation 1105, the genome update module 700 updates the identified genes by flagging them based on the level of stress associated in a given region. A flagged gene makes the gene more susceptible to mutation in operation 1107 so that areas under stress are more likely to be modified in a way that relieves that stress in connectomes constructed from an updated genome.

In operation 1107, the genome update module 700 updates the genome with information from step 3 to generate a new modified genome.

As part of the process of creating new genomes 800 in accordance with an offline or generational update of a genome, mutations are injected into the previous genome 100 so that the next generation can be created with a new network structure, thereby leading to a different performance. Genomes from high performing artificial brains may also be crossbred to generate a new generation.

As an example, as part of gene modification, the gene controlling the neuron density in a cortical layer 123 corresponding to vision region V1 can be increased, where a new artificial brain generated from this modified genome would have a V1 layer containing more neurons than the previous generation of the brain, where this new brain may have different behavior when trained on the same training data as the previous brain. For example, in some embodiments the form of the mutation is sensitive to the type of gene that it acts on. If the gene is represented as a numerical value (e.g., a floating point number or an integer), then then a percentage change may be applied to the number or equivalently, the numerical value may be scaled by a scaling factor (in the case of an integer, the value after applying the percentage change may be rounded to arrive at an integral value). As another example, if the gene is a Boolean value, then the mutation may relate to some probability of flipping or toggling the Boolean value (e.g., from False to True or from True to False). Similarly, mutations controlling the connections between layers may cause different layers of the connectome 300 to be exposed to different firing patterns.

In some embodiments of the present disclosure, the genome update module 700 applies genetic algorithms to generate updated genomes 800 based on one or more genomes stored in the genome repository 110. In these embodiments, a first genome is selected from the genome repository, such as by selecting: the genome from the genome repository 110 with the highest evaluated fitness; the newest genome in the genome repository 110 (e.g., most recently created and/or genomes that have not yet been used to generate new genomes); or a random genome from the genome repository 110.

After the selection, the genome update module 700 randomly determines whether to use the selected genome as-is or to modify the genome through mutation or cross-over.

In some embodiments of the present disclosure, mutation of a genome is performed by modifying the value of various numerical parameters (genes) within the genome. In some embodiments, the change is a random percentage between −30% and +30%. In some circumstances, such as after the fitness of a genome exceeds a threshold value such as 50%, the percentage change window is reduced to ±10% to allow for smaller fluctuations and hence finer tuning.

Changing parameter values through mutation results in a new anatomical structure and influences the behavior of the connectome that ultimately leads to a change in system performance (either improved or diminished).

Some embodiments, crossover of a genome is performed by swapping a portion of one genome with a corresponding portion of another genome. In some embodiments of the present disclosure, crossover is performed by selecting two genomes from the pool of top-performing genomes available in the genome repository 110, reading a random set of genes from one genome, and swapping the values of those genes with corresponding genes of its counterpart.

Figure 12:
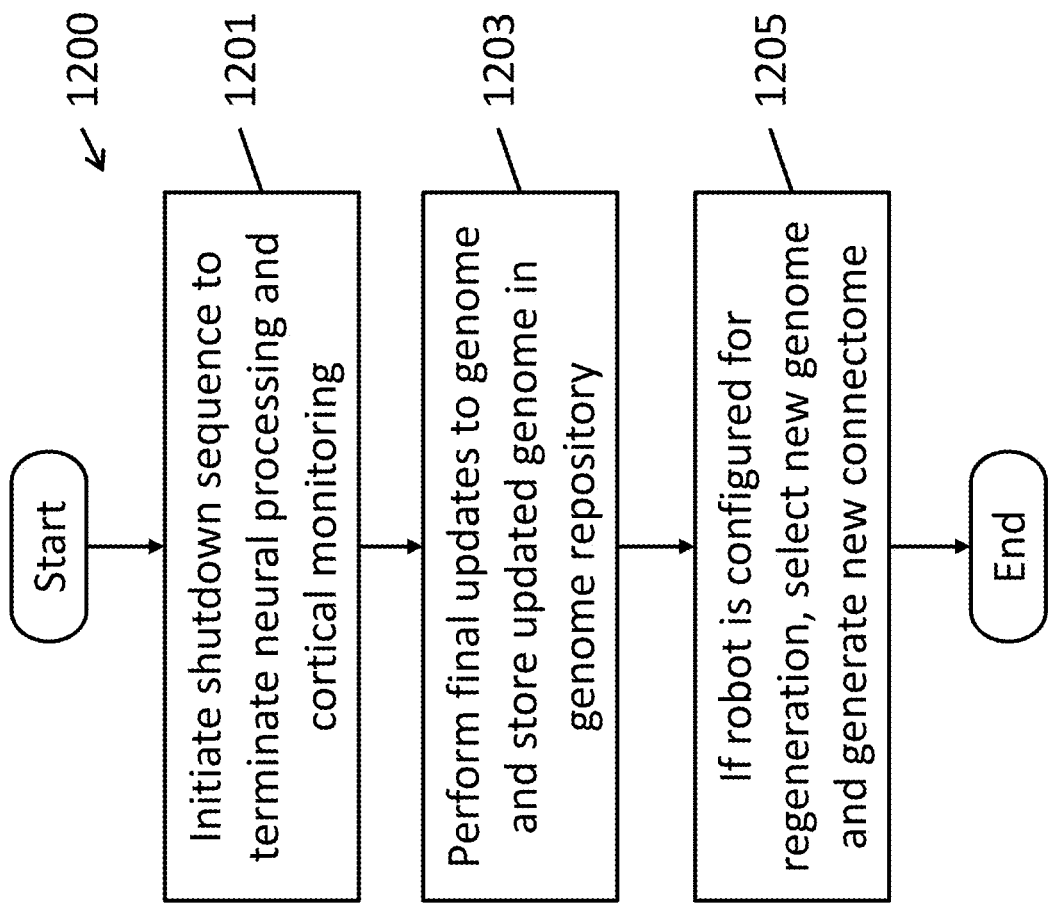
FIG. 12 is a flowchart of a method for shutting down the operation of a connectome according to one embodiment of the present disclosure.

When a connectome 300 has reached the end of its useful life (e.g., when its performance in response to further training has plateaued or when it is otherwise time to replace the connectome with a new connectome 300 generated from a different genome), it may be shut down. FIG. 12 is a flowchart of a method 1200 for shutting down the operation of a connectome according to one embodiment of the present disclosure. In operation 1201, the NPU 500 operating the connectome initiates a shutdown sequence to terminate processes related to neural processing and cortical monitoring. In operation 1203, the genome update module 700 performs any final updates to the genome based on any remaining activity logs 600 and stores updated genome in the genome repository 110. In operation 1205, if the robot is configured for regeneration, the process may begin again by selecting a new genome from the genome repository, performing neuroembryogenesis 20 by the neuroembryogenesis unit 200 to generate a new connectome, and loading the new connectome into the robot.

Some aspects of embodiments of the present disclosure relate to systems and methods for dynamically connecting, disconnecting, and modifying the behavior of input and output devices against a neural network.

In more detail, some aspects of embodiments of the present disclosure relate to purpose-built cortical pathways as part of the neural network through genome encoding for any given input or output type such as audio, visual, tactile, and other sensory input along with motor, motion, and speech for output. In some embodiments, the cortical pathways defined in an artificial genome for a neural network are modeled after corresponding biological structures. For example, in some embodiments, a portion of a cortical pathway for processing input from visual input devices (such as cameras) is modeled after visual pathways and structures of biological brains, where the cortical pathway may define portions of an IPU configured for visual processing and may define cortical regions of the connectome 300. In more detail, a visual processing cortical pathway in a biological human brain may include the retina of the eye, the thalamus, and the primary visual cortex (which may include areas such as V1, V2, and so on). Accordingly, in some embodiments, an artificial genome includes genes defining a cortical pathway in an IPU and/or a connectome, where the genes include definitions of cortical regions that have the similar relative sizes, neuron densities, and connections as those in a biological visual cortical pathway, such as at the input of the IPU 320 (corresponding to connections at the retina), structures within the IPU 320 (e.g., structures within the thalamus), and cortical areas within the connectome 300 (e.g., corresponding to the primary visual cortex). In some embodiments, the artificial genome also include genes defining lower-level structures of each of these cortical areas in a manner that corresponds to their biological analogues, such as sub-structures or sub-regions within cortical regions, down to the level of individual neurons that may be distributed across a particular cortical region. As a concrete example, in some embodiments, these genes are represented using key-value pairs such as: {Neuron count: 100000, Neuron morphology: Spherical, Neuron firing frequency: 0.01 sec, Cortical dimensions: 100, 100, 100}. As noted above with respect to FIG. 4A, the connections made by axons and dendrites of a particular cortical region may generally be classified into a variety of different geometric models (e.g., spherical, cylindrical, conical). In addition, neurons within each cortical layer may connect to one another at particular connection rates or connection ratios as well as connect to neurons in other cortical layers based on different connection rates and connection ratios. In some embodiments, these connection rates or connection ratios are similarly modeled after connection rates or connection ratios observed in biological brains. While the above discussion presented one example in the context of a visual input cortical pathway, embodiments of the present disclosure further relate to similar cortical pathways for processing audio sensor information (e.g., microphone data) and tactile sensor information (e.g., force or pressure sensors) modeled after audio processing and tactical processing portions of biological brains. Likewise, controls of robotic motor devices, motion, and audio output (e.g., cortical pathways leading to the OPU 330) may similarly be modeled after corresponding structures in biological brains (e.g., portions of the brain for motor control and speech).

Some aspects of embodiments of the present disclosure further relate to sensor fusion within the IPU 320 and/or the connectome 300 and, likewise, output fusion within the OPU 330 and the connectome 300. In comparative robotic control systems, inputs from different types of sensor devices (e.g., different cameras, radar or lidar detectors, microphones, and the like), and specialized algorithms are typically used to combine information from the different sources (e.g., performing calibration and registration to geometrically align information from different cameras, radar, and lidar detectors with directional information from microphones, and to perform temporal alignment of inputs).

In more detail, some aspects of embodiments relate to performing sensor fusion in a connectome 300. In the case of combining the sensory information (sensor fusion of inputs from sensor devices), some embodiments of the present disclosure relate to the use of the ability of the neural network architecture to simulate and implement cortical structures responsible for exhibiting cross-functional behavior. For example, in some embodiments, the artificial connectome 300 includes a cortical structure that corresponds to the cerebellum of a biological brain. This artificial cerebellum according to some embodiments is configured to collect sensory information from multiple IPU sources and help coordinate voluntary movements such as balance and posture of a robot by processing the sensory information and directing it back to the motor OPU involving multiple motor targets. In some embodiments, implementation of an artificial cortical structure corresponding to a biological cerebellum includes genes of a genome that define such a cortical area of a connectome, the neurons and the neuronal connectivity within that cortical area or cortical structure and connections to IPU and OPU related neurons respectively. In some embodiments, some cortical structures within the connectome provide a looped structure by connecting a group of neurons back-to-back in a circular or looped fashion (e.g., where a portion of a cortical pathway supplies inputs to an earlier part of the same cortical pathway) to provide capabilities such as time delay. Other structures designed or patterned after memory related structures in a biological brain (such as the hippocampus and other structures that contribute to higher level memory formation) play a corresponding role in an artificial connectome 300 in storing memories representing a fusion of information from multiple IPU sources.

As noted above, input signals from input devices 370 activate input neurons in the connectome 300 that are connected to the IPU 320. These input neurons connect to other neurons in the connectome 300, where these neurons in the connectome 300 trigger corresponding input cortical pathways (e.g., separate input cortical pathways for processing camera images, microphone audio signals, LIDAR signals, and the like). In some embodiments, the separate input cortical pathways for processing different sensor inputs connect together at one or more sensor fusion cortical regions of the connectome 300, e.g., where some neurons within a sensor fusion cortical region are target neurons that receive inputs from two different cortical pathways corresponding to two different inputs. Accordingly, a sensor fusion cortical region according to embodiments of the present disclosure fuses information from two different sensors.

Likewise, control of individual actuators, such as individual motors, is explicitly and manually coordinated, such as algorithms for controlling the movement of each joint in a robotic arm such that the end of the arm is positioned as desired. In contrast, in some embodiments of the present disclosure, the IPU 320 translates all sensor inputs from the input devices 370, in their different formats, into the common format of spiking signals for processing by the connectome 300. For example, an output fusion cortical area may trigger cortical pathways corresponding to two or more different output devices (e.g., motors controlling two different joints of a robot arm or motors controlling two opposite legs of a bipedal humanoid robot). Accordingly, a same set of signals received at the output fusion cortical layer can be used to control two different output devices 380, including two output devices of disparate types (e.g., a motor and a speaker or a motor and a light).

Likewise, the OPU 330 translates all outputs of the connectome 300 from a common format of spiking signals into outputs for controlling the output devices 380. By processing the input signals and generating outputs in a common format of spiking signals, a connectome 300 according to embodiments of the present disclosure automatically learns to perform sensor fusion between the different inputs from the IPU 320, based on the connections between the cortical pathways associated with the different sensor inputs. Likewise, particular cortical areas of the connectome 300 may trigger particular cortical pathways that are connected to output neurons that generate output signals supplied to the OPU 330 for controlling different output devices 380, thereby enabling the automatic coordination of multiple motors (e.g., for moving multiple joints of an arm and/or for walking), without requiring explicit definition of algorithms for performing this coordination of multiple outputs, but instead by defining a general structure corresponding to similar structures in biological brains and allowing the automatic training and automatic genome update processes to arrive at an architecture suitable for coordinating these multiple outputs.

Accordingly, various aspects of embodiments of the present invention described herein provide systems and methods for the automatic generation and update of artificial neural networks and evolution of architectures for those artificial neural networks based on performance of other artificial neural networks within the system. These artificial neural networks may be applied to a variety of use cases, including artificial neural networks for operating humanoid robots, where these artificial neural networks may be automatically trained based on techniques such as supervised learning and reinforcement learning to automatically generate networks to perform particular goals (e.g., classification of input images), without explicit programming on the part of a human programmer.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A method for automatically generating an architecture of a neural network, the method comprising:
    loading, by a computer system comprising a processor and memory, a first computer-readable representation of a first neural network architecture, the first computer-readable representation comprising a first genome comprising a first plurality of genes representing parameters and properties of the first neural network architecture;
    generating, by the computer system, a first neural network in accordance with the first neural network architecture specified in the first computer-readable representation, the first neural network comprising a plurality of neurons;
    deploying, by the computer system, the first neural network in a controller for a system or device;
    training the first neural network deployed in the controller by supplying inputs to an input processing unit connected to the first neural network and receiving outputs from an output processing unit connected to the first neural network, the training comprising updating a plurality of synaptic weights of a plurality of connections between the neurons of the first neural network based on responses to the inputs supplied to the input processing unit or neuronal activities within the first neural network;
    evaluating, by the computer system, a performance of the first neural network architecture based on the training of the first neural network; and
    generating, by the computer system, an updated computer-readable representation of an updated neural network architecture based on the evaluation of the performance the first neural network, the updated computer-readable representation comprising an updated genome comprising an updated plurality of genes representing updated parameters and properties of the updated neural network architecture,
    wherein the input processing unit is configured to generate input spiking signals to the first neural network from the inputs to the input processing unit based on a plurality of input processing unit parameters, and
    wherein the inputs to the input processing unit comprise external stimuli received from an input device connected to the input processing unit.

2. The method of claim 1, wherein the updated parameters and properties of the updated neural network architecture comprise updated parameters and properties of the input processing unit, and wherein the updated neural network architecture comprises an updated input processing unit,
    wherein the updated input processing unit is configured to compute updated input spiking signals to the first neural network from the inputs to the input processing unit based on the updated parameters and properties of the input processing unit,
    wherein the method further comprises:
        generating, by the computer system, an updated first neural network in accordance with the updated neural network architecture specified in the updated computer-readable representation;
        training the updated first neural network by supplying inputs to the updated input processing unit connected to the updated first neural network and receiving outputs from an updated output processing unit connected to the updated first neural network, the training comprising updating a plurality of synaptic weights of a plurality of connections between the neurons of the updated first neural network based on responses to the inputs supplied to the updated input processing unit; and
        evaluating the performance of the updated first neural network based on the training of the updated first neural network.

3. The method of claim 2, further comprising storing the updated computer-readable representation of the updated neural network architecture in response to determining that the performance of the updated first neural network is higher than the performance of the first neural network.

4. The method of claim 3, further comprising generating a second updated computer-readable representation of a second updated neural network architecture based on the evaluation of the performance of the updated first neural network.

5. The method of claim 1, wherein the training further comprises creating or eliminating neurons and synapses.

6. The method of claim 1, wherein the first computer-readable representation of the first neural network architecture is stored in a genome repository, the genome repository storing a plurality of computer-readable representations of a plurality of neural network architectures, and
wherein the method further comprises storing the updated neural network architecture in the genome repository.

7. The method of claim 6, the method further comprising collecting statistical data associated with the performance of the first neural network architecture based on the neuronal activities within the first neural network during the training,
wherein the genome repository further stores the statistical data in association with the computer-readable representation of the first neural network architecture.

8. The method of claim 1, wherein the generating the updated genome of the updated computer readable representation of the updated neural network architecture comprises updating the first plurality of genes of the first genome based on plasticity measures based on the neuronal activities within the first neural network based on mutations of the genes or crossover of a portion of the first genome with a corresponding portion of another genome in a genome repository.

9. A method for automatically generating an architecture of a neural network, the method comprising:
loading, by a computer system comprising a processor and memory, a first computer-readable representation of a first neural network architecture, the first computer-readable representation comprising a first genome comprising a first plurality of genes representing parameters and properties of the first neural network architecture;
generating, by the computer system:
a first neural network in accordance with the first neural network architecture specified in the first computer-readable representation, the first neural network comprising a plurality of neurons;
an input processing unit configured to receive a plurality of different sensor inputs and supply input signals to the first neural network based on the different sensor inputs; and
an output processing unit configured to generate a plurality of different outputs based on output signals received from the first neural network;
deploying, by the computer system, the first neural network in a controller for a system or device, the controller being configured to receive the plurality of different sensor inputs and supply the plurality of different outputs;
training the first neural network deployed in the controller by supplying inputs to the input processing unit and receiving outputs from the output processing unit, the training comprising updating a plurality of synaptic weights of a plurality of connections between the neurons of the first neural network based on responses to the inputs supplied to the input processing unit;
evaluating, by the computer system, a performance of the first neural network architecture based on the training of the first neural network; and
generating, by the computer system, an updated computer-readable representation of an updated neural network architecture based on the evaluation of the performance the first neural network, the updated computer-readable representation comprising an updated genome comprising an updated plurality of genes representing updated parameters and properties of the updated neural network architecture.

10. The method of claim 9, wherein the first neural network comprises:
a plurality of input cortical pathways corresponding to the plurality of different sensor inputs; and
one or more sensor fusion cortical regions,
wherein the plurality of input cortical pathways connect together at the sensor fusion cortical region.

11. The method of claim 10, wherein the sensor fusion cortical region performs associative learning between events processed by the plurality of input cortical pathways.

12. The method of claim 10, wherein the first neural network architecture comprises a structure configured to store memories representing a fusion of information from the plurality of input cortical pathways.

13. The method of claim 9, wherein the first neural network architecture further comprises one or more output fusion cortical areas configured to trigger cortical pathways corresponding to the plurality of different outputs.

14. The method of claim 13, wherein the plurality of different outputs comprise at least two disparate types of outputs.

15. A method for automatically generating an architecture of a neural network, the method comprising:
loading, by a computer system comprising a processor and memory, a first computer-readable representation of a first neural network architecture, the first computer-readable representation comprising a first genome comprising a first plurality of genes representing parameters and properties of the first neural network architecture;
generating, by the computer system:
a first neural network in accordance with the first neural network architecture specified in the first computer-readable representation, the first neural network comprising a plurality of neurons;
an input processing unit configured to receive inputs from a plurality of input devices and supply input spiking signals to the first neural network based on the inputs; and
an output processing unit configured to generate outputs for a plurality of output devices based on output spiking signals received from the first neural network;
deploying, by the computer system, the first neural network in a controller for a system or device, the controller being connected to the plurality of input devices and the plurality of output devices;
training the first neural network deployed in the controller by supplying inputs to the input processing unit and receiving outputs from the output processing unit, the training comprising updating a plurality of synaptic weights of a plurality of connections between the neurons of the first neural network based on responses to the inputs supplied to the input processing unit;
evaluating, by the computer system, a performance of the first neural network architecture based on the training of the first neural network; and
generating, by the computer system, an updated computer-readable representation of an updated neural network architecture based on the evaluation of the performance the first neural network, the updated computer-readable representation comprising an updated genome comprising an updated plurality of genes representing updated parameters and properties of the updated neural network architecture.

16. The method of claim 15, wherein the input devices are directly connected to the first neural network through the input processing unit and a neuron processing unit.

17. The method of claim 15, wherein the input processing unit comprises a plurality of input neurons, and
wherein the memory of the controller stores a middleware module configured to map input signals from the input devices to activations of the input neurons of the input processing unit.

18. The method of claim 17, wherein the input devices comprise a camera,
wherein the input signals comprise an image comprising a plurality of pixels,
wherein the input neurons are arranged in a two-dimensional grid, and
wherein the middleware module is configured to map properties of pixels of the image to neurons in corresponding portions of the two-dimensional grid.

19. The method of claim 17, wherein the input devices comprise a microphone,
wherein the input signals comprise an audio signal,
wherein the input neurons are arranged in a linear array corresponding to different portions of an audio spectrum, and
wherein the middleware module is configured to map the audio signal to the input neurons in accordance with coefficients representing a spectrum of a time window of the audio signal.

20. The method of claim 15, wherein the output devices are directly connected to the first neural network through the output processing unit and a neuron processing unit.

21. The method of claim 20, wherein a plurality of output neurons is connected to the output processing unit, and
wherein the memory of the computer system stores a middleware module configured to map activations of the output neurons, received at the output processing unit, to commands to control the output devices.

* * * * *